United States Patent Office 3,803,182
Patented Apr. 9, 1974

3,803,182
DISTEROIDYL-ETHERS
Alberto Ercoli, Milan, Rinaldo Gardi, Carate Brianza, and Romano Vitali, Casatenovo, Italy, assignors to Warner-Lambert Company, Morris Plains, N.J.
No Drawing. Filed Nov. 22, 1971, Ser. No. 201,243
Claims priority, application Italy, Nov. 24, 1970, 32,154/70
Int. Cl. C07c *169/20*
U.S. Cl. 260—397.4
40 Claims

ABSTRACT OF THE DISCLOSURE

Biologically active disteroidyl ethers of the following formula are disclosed:

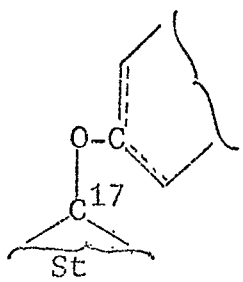

wherein the broken line indicates the presence of a double bond in the 2'(3') or 3'(4') positions; St is a steroid residue belonging to the androstane, 19-nor-androstane, gonane and 13-lower alkyl gonane series; and St' is a steroid residue belonging to the androstane and pregnane series, and their 18-homo and 19-nor derivatives. These disteroids are prepared by reacting a corresponding 17-β-hydroxy steroid of said androstane, 19-nor-androstane, gonane and 13-lower alkyl gonane series with an enolized or acetalized 3-ketosteroid of the androstane, pregnane series and 18-homo and 19-nor analogs thereof, under anhydrous conditions and in the presence of an acid catalyst.

GENERAL DESCRIPTION OF THE INVENTION

The present invention relates to novel compositions of matter classified in the art of steroid chemistry as disteroidyl-ethers and to processes for their preparation. The disteroidyl ethers of this invention have valuable biological properties and consist of two steroid moieties joined together by an oxygen bridge which involves the carbon atoms in 17-position of a steroid moiety and the carbon atom in 3'-position of the other steroid moiety according to the partial structure:

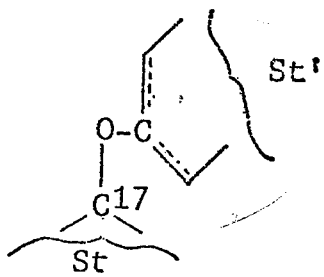

wherein the broken line indicates the presence of a double bond in 2'(3') or 3'(4') positions.

The positions of the steroid moiety St' are marked accordingly (i.e. $C^{1'}$, $C^{2'}$, $C^{3'}$ and so on) to distinguish them from the corresponding positions of the other steroid moiety St.

The steroid nucleus St, whose $C_{17}$ is joined to the oxygen bridge, belongs to the series of androstane, 19-nor-androstane, gonane and 13-lower alkyl gonane series; the other steroid nucleus St' having its $C_{3'}$ joined to the oxygen bridge, belongs to the series of androstane, pregnane and their 18-homo and 19-nor derivatives.

The new disteroidyl-ethers of this invention are prepared by reacting a 17β-hydroxy steroid of said androstane, 19-nor-androstane, gonane and 13-lower alkyl gonane series with an enolized or acetalized 3-ketosteroid of the androstane, pregnane series and 18-homo and 19-nor analogs thereof, or alternatively, by reacting an activated ether derivative of said 17β-hydroxysteroid reagent with the corresponding 3-ketosteroid.

This reaction is carried out under anhydrous conditions, in the presence of an acid catalyst at temperatures between 50° C. and 200° C. for a period of from 30 minutes to 4 hours.

The term "enolized or acetalized 3-ketosteroid" is used herein to indicate the typical enol- or acetal-derivatives, such as enol ethers, enol esters, hemiacetals or acetals of the 3-keto function, preferably alkyl enol ethers or dialkyl acetals of said 3-ketosteroid. The term "activated ether derivative of 17β-hydroxysteroid" means a steroid-17β-yl enol ether, such as a 17-cycloalkenyl, and preferably a 17-cyclopent-1'-enyl of said 17β-hydroxy steroid.

Included among the preferred embodiments of the compositions of matter of this invention are compounds selected from the group consisting of disteroidyl ethers of the androstane-androstane series and androstane-pregnane series and the 18-homo and 19-nor analogs thereof represented by the following structural Formulae I and II:

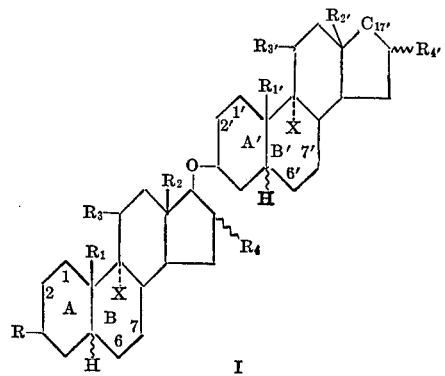

I

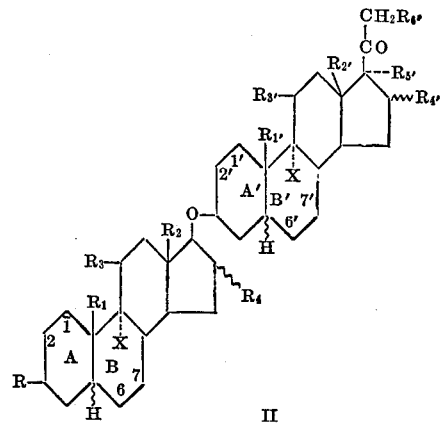

II wherein the wavy line in 5, 5' and 16' position indicates that the hydrogen atom or the possible substituents may have the α or β configuration;

R represents hydrogen, a ketonic oxygen, an α- or β-hydroxy group, an α- or β-acyloxy group containing up to 10 carbon atoms or an α- or β-alkoxy group whose alkyl consists of an aliphatic, cycloaliphatic or aromatic radical containing up to 10 carbon atoms;

$R_1$ and $R_{1'}$ represent each hydrogen or methyl;

$R_2$ and $R_{2'}$ represent each hydrogen or lower alkyl, such as methyl, ethyl, propyl and isopropyl;

$R_3$ and $R_{3'}$ represent each hydrogen, hydroxy or ketonic oxygen, a methyl group or a chlorine atom when also X represents chlorine;

$R_4$ and $R_{4'}$ represent each hydrogen, an α-hydroxy group, free or esterified with an aliphatic acid containing up to 4 carbon atoms, a halogen atom, a lower alkyl or a lower alkylene radical, preferably a methyl or methylene radical;

$R_{5'}$ represents hydrogen, hydroxy or acyloxy group containing up to 10 carbon atoms;

$R_{6'}$ represents hydrogen, hydroxy, an acyloxy group containing up to 12 carbon atoms, a hydroxy group esterified with an inorganic oxygenated acid, or a halogen atom, particularly chlorine or fluorine;

X represents hydrogen or a halogen atom;

$R_{5'}$ and $R_{6'}$ or $R_{4'}$ and $R_{5'}$ may form together a new ring

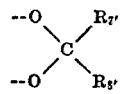

wherein $R_{7'}$ represents an alkyl radical containing up to 4 carbon atoms or an aryl and $R_{8'}$ represents an alkyl or alkoxy radical containing up to 4 carbon atoms or, alternatively, a ring

consisting of a cycloalkyl group containing from 5 to 12 carbon atoms.

The carbon atom in 17' position of the Formula I may have one of the following structures:

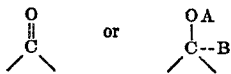

wherein:

A represents hydrogen, an aliphatic, cycloaliphatic or aromatic radical containing up to 10 carbon atoms, an acyl radical containing up to 12 carbon atoms or the residue of an inorganic oxygenated acid;

B represents hydrogen or a saturated or unsaturated alkyl radical containing up to 4 carbon atoms inclusive, such as methyl, ethyl, propyl, butyl and their isomers, vinyl, allyl, allenyl, ethynyl, propynyl and butynyl.

The rings A and B may have one unsaturation between the carbon atoms in 1:2, 2:3, 4:5, 5:6, 5:10 positions; or two unsaturations between the carbon atoms in 1:2 and 4:5; or 4:5 and 6:7 positions.

In accordance with the nature of the reacting 3-ketosteroid, the rings A' and B' show one of the following structures:

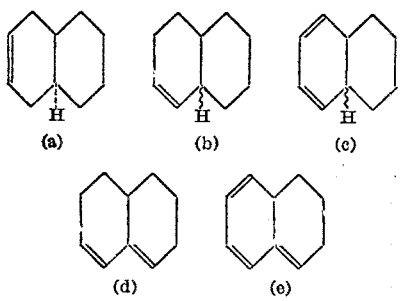

The compounds of the invention may present, in addition to the above specified substituents, a methyl radical or a halogen atom, particularly fluorine or chlorine, in one or more of the 1, 1', 2, 2', 6, 6', 7 and 7' positions.

The positions 7 and 7' may be further substituted by thioacyl groups and the position 1–2 and 1'–2' may carry a methylene bridge.

Also some 17'-spiro lactones of the 7'-acylthio-substituted compounds of Formula I fall within the scope of this invention: substituted compounds in this group which are particularly interesting are those in which the 3-keto-steroid moiety consists of the 17-spiro-lactone of 3-keto-7α-acetylthioandrost-4-ene and its 19-nor analog.

A further object of this invention is represented by those disteroidyl compounds in which the 3-keto-steroid moiety is aldosterone, 17-isoaldosterone and derivatives thereof.

The acyloxy and acyl radicals which are present in the Formulae I and II may be derivatives of organic and inorganic acids, particularly of organic saturated or unsaturated carboxylic acids (aromatic acids included) which may be formed by a straight or branched aliphatic chain, a cycloaliphatic, arylaliphatic or aromatic chain. They may also be substituted by alkoxy or amino groups, halogen atoms and the like. Typical esters are the acetate, propionate, butyrate, valerate, oenanthate, caproate and their isomers, the trimethylacetate, aminoacetate, hemisuccinate, hemimalonate, hemiphthalate, phenoxyacetate, phenylpropionate, phenylbutyrate, cyclopentylacetate, cyclopentylpropionate, cyclohexylacetate, β-chloropropionate, laurate, benzoate, p.chloro- or fluoro-benzoate, and the like.

Among the inorganic oxygenated acids, the sulfuric, phosphoric acids and salts thereof with alkali metals or organic bases are preferred.

The aliphatic, cycloaliphatic, arylaliphatic or aromatic radical containing up to 10 carbon atoms may be straight or branched, saturated or unsaturated and optionally substituted by functional groups.

Typical radicals are methyl, ethyl, vinyl, propyl, butyl, amyl, hexyl and their isomers, cyclopropyl, cyclobutyl, cyclopentyl, cyclohexyl, cycloheptyl, cyclooctyl, cyclopentenyl, cyclohexenyl, cyclooctenyl, benzyl, p.chlorobenzyl, 1-methoxycyclopentyl, 1-ethoxycyclopentyl, 1-methoxycyclohexyl, 1-ethoxycyclohexyl, tetrahydropyranyl, and the like.

The new disteroidyl ethers of this invention exhibit improved and/or increased hormonal properties as compared with those possessed by the two steroid entities. This means that the resulting properties in the new compounds are not merely a sum of the activities of the two individual steroid moieties since the disteroidyl compounds show a degree of activity and a biological behavior which are different from those shown by a simple mixture of the two constituting steroids.

In particular, the disteroidyl ethers of Formula I wherein the $C_{17'}$ carbon atom has the structure

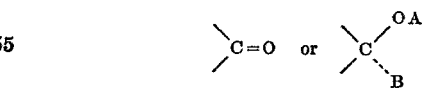

(B being hydrogen or lower alkyl) are andro-anabolic agents having a more favorable anabolic/androgenic ratio or a higher anabolic activity as compared with that resulting from the two component steroids. Therefore, the new compounds may be advantageously used in place of androgenic or anabolic agents used in known pharmaceutical preparations. They may be orally or subcutaneously administered to patients, the route and dose varying with the nature and the severity of the symptoms to be treated.

Typical derivatives of this class of compounds include:

17β-(17'β-propionoxy-19'-nor-androsta-3',5'-dien-3'-yloxy)-19-norandrost-4-en-3-one, 17β-(17'β-benzoyloxy-19'-norandrosta-3',5'-dien-3'-yloxy)-19-norandrost-4-en-3-one, 17β-(17'β-phenylpropionoxy-19'-norandrosta-3',5'-dien-3'-yloxy)-19-norandrost-4-en-3-one, 17β-(17'β-lauryloxy-19'-norandrosta-3',5'-dien-3'-yloxy)-19-norandrost-4-en-3-one, 17β-(17′β-hydroxy-19′-norandrosta-3′,5′-dien-3′-yloxy)-19-norandrost-4-en-3-one and the corresponding 17-hemisuccinate thereof.

These compounds show a prolonged anabolic activity after single injection which is much higher than that shown by the single parent steroids. They also possess a much more advantageous anabolic/androgenic ratio and show high anabolic activity also when orally administered.

The comparison carried out between 17β-(17′β-propionoxy-19′-norandrosta-3′,5′-dien-3′-yloxy) - 19 - norandrost-4-en-3-one and the well known 17β-hydroxy-estr-4-en-3-one decanoate (which is one of the most active anabolic agents) proved that at the same dose, 17β-(17′β-propionoxy-19′-norandrosta - 3′,5′ - dien-3′-yloxy)-19-norandrost-4-en-3-one shows a higher anabolic activity—deduced from the weight of the muscle "levator ani"—and a much lower androgenic activity—deduced from the weight of the seminal vesicles—than the reference compound.

The new disteroidyl ethers of Formula I wherein the $C_{17'}$ carbon atom has the structure

(B being a lower alkenyl or alkynyl radical, i.e. 17′α-vinyl, allyl, allenyl, ethynyl, propynyl and the like) and those disteroidyl ethers deriving from a progesterone moiety (i.e. compounds of Formula II wherein $R_{6'}$ is hydrogen and $R_{5'}$ is hydrogen, hydroxy or acyloxy) possess improved and increased progestational activity and exhibit anti-conceptional properties. In addition, these new classes of compounds show anti-uterotrophic, anti-hypophysis and estrogenic actions to a certain extent, but these side-activities, which are usually connected with a progestinic activity, are exhibited in a different degree as compared with the total activity of the progestational entity or entities incorporated in the disteroidyl compound.

This is particularly evident in compounds such as

17β-(17′α-acetoxy-20′-oxopregna-3′,5′-dien-3′-yloxy)-5α-androstan-3-one,

17β-(17′β-acetoxy-19′-nor-17′α-pregna-3′,5′-dien-20′-yn-3′-yloxy)-androst-4-en-3-one, 17β-(17′β-acetoxy-19′-nor-17′α-pregna-3′,5′-dien-20′-yn-3′-yloxy)-estr-5-en-3-ol acetate, 17β-(17′α-acetoxy-20′-oxo-6′-methylpregna-3′,5′-dien-3′-yloxy)-19-nor-androst-4-en-3-one, and 17β-(17′β-acetoxy-19′-nor-17′α-pregna-3′,5′-dien-20′-yn-3′-yloxy)-estr-4-en-3-one.

These compounds show a remarkable increase of progestational activity in comparison with the activity displayed by the progestational moiety and in addition show a lower antigonadotrophic action.

Thus, they are useful therapeutic agents having nearly pure progestational activity and for this reason can be advantageously used for the treatment of physiological disorders in female animals and in women in similar manner as known progestins, e.g. progesterone, ethisterone and the like.

It is also to be pointed out that all disteroidyl ethers of the above classes have a biological behavior (evaluated as to the antiuterotropic and antihypophysis activity, as well as the activity on the reproductive physiology) which generally differs from that shown by the mixture of the two component steroids.

The disteroidyl ethers of Formula II above (wherein $R_{6'}$ is other than hydrogen) possess cortical activity and exhibit increased and prolonged anti-inflammatory activity. Of particular interest and importance are compounds which incorporate a cortical moiety deriving from 11β-hydroxycorticosteroids, such as hydrocortisone, prednisolone, their 6α-halo or 6α-methyl derivatives, their 9α-fluoro or 9α-chloro analogs, betamethasone, dexamethasone, 9α-fluoro 16-methylene prednisolone, and corresponding 17-esters and/or 21-esters thereof, and from the corresponding 11-keto and 11-dehydro analogs of the foregoing 11β-hydroxy compounds.

The new disteroidyl ethers belonging to the class of corticoids possess potent anti-inflammatory activity and are used for the treatment of inflammatory conditions in the same manner as known corticoids. Thus they may be administered by intracutaneous or intramuscular route in aqueous suspension or in aqueous solution when the corresponding 21′-hemisuccinate alkali metal salt is used. They may also be administered orally in the form of tablets, capsules or syrups (in aqueous or non-aqueous suspensions), or topically as creams, lotions or in the form of ophthalmic suspensions. In each instance the pharmaceutical preparations are prepared according to procedures well known in the art.

In general the pharmaceutical formulations of our disteroidyl ethers corresponding to Formulae I and II are prepared and administered utilizing procedures known in the art.

DETAILED DESCRIPTION OF THE PROCESS

According to the present invention the process for the preparation of the preferred new disteroidyl ethers of Formulae I and II consists in reacting a 17β-hydroxy steroid of the androstane, 19-nor-androstane, gonane and 13-lower alkyl gonane series (III) under anhydrous conditions, in a suitable solvent such as for example benzene, toluene, dimethylformamide and isooctane, and in the presence of a suitable acid catalyst—such as for example p-toluenesulfonic-, naphthalenesulfonic acid, pyridine p-toluenesulfonate, pyridine chlorhydrate and the like—with an enolized or acetalized 3-ketosteroid of the androstane, pregnane series and their 18-homo or 19-nor analogs (IV or V), at a temperature between 50° C. and 200° C., preferably at a temperature higher than 70° C., for a period of from 30 minutes to 4 hours.

In alternative, the compounds of the invention may be also prepared by reacting, instead of the 17β-hydroxy steroid of the said androstane, 19-norandrostane, gonane and 13-lower alkylgonane series, an activated ether derivative thereof with the 3-keto steroid of the androstane, pregnane series and their 18-homo or 19-nor analogs.

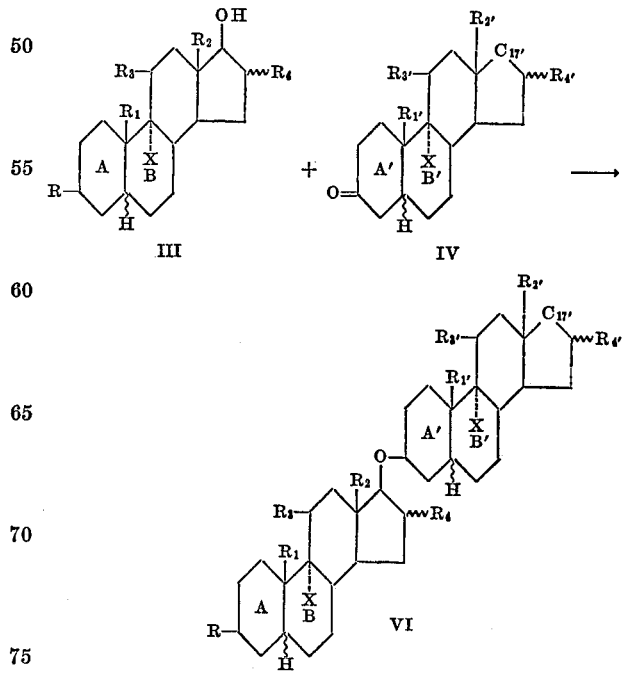

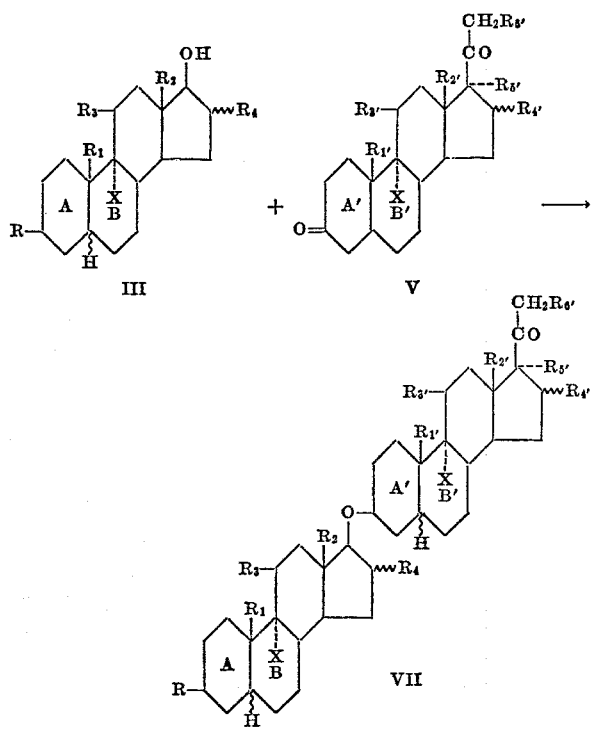

In the above formulae there are present all the possible substituents cited for the Formulae I and II; the rings A' and B' of the Formulae VI and VII have one of the structures (a)–(e) and the substituents R, $R_1$, $R_{1'}$, $R_2$, $R_{2'}$, $R_3$, $R_{3'}$, $R_4$, $R_{4'}$, $R_{5'}$, $R_{6'}$, X and the atom $C_{17'}$ have the abovesaid meaning with the exception that $R_{6'}$ is never a free hydroxy group and A is never hydrogen. In order to obtain those compounds in which $R_{6'}$ is a free hydroxy group and in the carbon atom $C_{17'}$, A is a hydrogen atom, the compounds of Formulae VI and VII may be submitted to alkaline hydrolysis.

The present invention includes all those compounds which may be obtained through obvious reactions, such as saponification which may be carried out on any possible acyloxy group present in the disteroidyl compound; acylation or etherification, by which a desired acyloxy or an ether group may be introduced in place of a free hydroxy group and alkylation generally carried out by means of an appropriate alkyl magnesium halide.

The structure of the disteroidyl derivative obtained through the etherification of a 17β-oxy-androstane or 19-nor-androstane (III) with a keto-steroid (IV or V) strictly depends from the nature of the steroid itself. The following scheme is given:

alkyl orthoformiate and of the corresponding alcohol over the 3-ketone according to Serini and Köster's method (Ber. 71, 1766; 1938). The enol ethers of saturated 3-keto steroids (5α or 5β) may also be obtained by reacting the 3-keto steroid with methanol in the presence of an acid catalyst, according to the method of M. Janot et al.; (Bull. Franc. 2109, 1961) or to the method of J. Slomp et al. (J.A.C.S. 77, 1216, 1955).

By submitting a dialkyl acetal of the saturated 3-ketone to pyrolysis under analogous conditions to those disclosed by H. H. Inhoffen and Coll. (Ann. 568, 52, 1950), the corresponding enol ether is obtained. It will have the structure: (a) $\Delta^2$-ene, 5α if the 4-keto steroid belongs to the series 5α, or the structure (b) $\Delta^3$-ene-5β if the 3-keto belongs to the series 5β.

The enol ethers of 3-keto-5α-steroids having a $\Delta^2$-ene structure may be obtained, according to the method described in our U.S. Pat. No. 3,118,917, by catalytic hydrogenation of the double bond in 5-position from the corresponding enol ethers of analogous $\Delta^4$-3-ketones (that is ethers of 3-oxy-$\Delta^{3,5}$-diene steroids), followed by spontaneous migration of the remaining double bond from the 3:4 position to the 2:3 position.

The enol ethers of 3-keto 5α-steroids having a $\Delta^3$-ene structure may be obtained, according to the method described in our U.S. Pat. No. 3,264,329, by catalytic hydrogenation of the corresponding enolethers of $\Delta^4$-3-ketosteroids in the presence of a catalytic amount of a basic substance.

(c) and (c') The enol ethers of $\Delta^1$-3-keto-5α-steroids having the $\Delta^{1,3}$-diene structure may be obtained by submitting the triethers of 1α,3,3-trihydroxy-5α-steroids to pyrolysis as described in British Pat. No. 1,203,278 and as disclosed and claimed in the U.S. Pat. application Ser. No. 830,841 filed June 5, 1969.

The pyrolysis reaction is preferably carried out at a temperature of from 60° C. to 155° C., in the presence of a suitable acid catalyst.

The triethers of 1α,3,3-trioxysteroids starting materials are in their turn prepared by the process disclosed and claimed in the U.S. Pat. No. 3,475,467. They may be obtained by treating the $\Delta^1$-3-keto-5α-steroids with an alcohol and an orthoformiate under anhydrous conditions at a temperature lower than 60° C. in the presence of an acid catalyst.

According to the process of the present invention, both 1α,3,3-trialkoxysteroids and the corresponding $\Delta^1$-3-keto enol ethers may be used for the condensation reaction with the 17β-hydroxy steroid but the formers, being the precursors of the enol ethers, have the advantage of a more immediate preparation and therefore may be preferred starting materials for the preparation of the disteroidyl derivatives having a $\Delta^{1,3}$-diene structure.

(d) The enol ethers of $\Delta^4$-3-ketones may be easily pre-

| Parent 3-keto compound | Enolethers or acetals starting materials | | Structure of the rings A' and B' in the disteroidyl compound |
|---|---|---|---|
| 3-keto-5α-steriod | 3-keto-5α-steroid enol ether | 3-keto-5α-steroid acetal | (a) $\Delta^2$-ene, 5α. |
| 3-keto-5β-steroid | 3-keto-5β-steroid enol ether | 3-keto-5β-steroid acetal | (b) $\Delta^3$-ene, 5β. |
| $\Delta^1$-3-keto-5α-steroid | $\Delta^1$-3-keto-5α-steroid enol ether | 1α-alkoxy-3-keto-5α-steroid acetal | (c) $\Delta^{1,3}$-diene, 5α. |
| $\Delta^1$-3-keto-5β-steroid | $\Delta^1$-3-keto-5β-steroid enol ether | 1α-alkoxy-3-keto-5β-steroid acetal | (c)¹ $\Delta^{1,3}$-diene, 5β. |
| $\Delta^4$-3-keto-steroid | $\Delta^4$-4-keto-steroid enol ether | | (d) $\Delta^{3,5}$-diene. |
| $\Delta^{1,4}$-3-ketosteroid or 1α-alkoxy-$\Delta^4$-3-keto-steroid. | $\Delta^{1,4}$-3-keto-steroid or 1α-alkoxy-$\Delta^4$-3-keto-steroid enol ether. | | (e) $\Delta^{1,3,5}$-triene. |

The preferred alkyl- or substituted alkyl enol ethers are those containing from 1 to 7 carbon atoms, such as methyl-, ethyl-, β-halogen substituted ethyl-, propyl-, butyl-enol ether and their isomers. Furthermore cycloalkyl-enol ethers containing 5 or 6 carbon atoms or an allyl-enol ether may be used. As acetal, the dimethyl- or diethyl-acetal is preferably used.

Preparation of the starting materials (a) and (b) The acetals of saturated 3-ketones (5α or 5β) may be easily prepared by simultaneous action of an pared by submitting the $\Delta^4$-3-ketosteroid to enol etherification with an alkyl orthoformiate or an alcohol, according to well known procedures of the art.

When, as reagent material in the method of the present invention, there is used an enol ether of a $\Delta^4$-3-ketone containing a higher alkyl radical than methyl or ethyl, the method disclosed in our U.S. Pat. No. 3,019,241 may be applied to the preparation of such reacting materials. This method consists in submitting the methyl- or ethyl-enol ether to trans(enol)-etherification by treatment with a higher alcohol.

(e) The 3-enolethers of 3-keto-$\Delta^{1,4}$-steroids may be obtained by enol-etherification of the 3-keto $\Delta^{1,5}$-pregnadiene with ethyl orthoformate and an alcohol in the presence of a strong acid catalyst as described in the U.S. Pat. No. 3,068,253. In place of the 3-enolethers of 3-keto-$\Delta^{1,4}$-steroids there may be used, for the preparation of the disteroidyl compounds having a $\Delta^{1,3,5}$-triene structure, the corresponding alkyl enol ethers of 1α-alkoxy-$\Delta^4$-3-ketones (or 1α,3-alkoxy-$\Delta^{3,5}$-dienes). These compounds are obtained by submitting the $\Delta^{1,4}$-3-keto-steroids to the simultaneous action of an alkyl orthoformiate and of the corresponding alcohol under anhydrous conditions at a temperature lower than 60° C., in the presence of a suitable acid catalyst.

The method for preparing 1α,3-dialkoxy-$\Delta^{3,5}$-diene steroids of the pregnane series is disclosed in our U.S. Pat. No. 3,506,650. This method may be applied to the preparation of corresponding 1α,3-dialkoxy-$\Delta^{3,5}$-diene steroids of the androstane series and of their 19-nor or 18-homo derivatives.

The following examples are given to illustrate the invention without limiting it.

In order to make easier the description of the preparation of a number of compounds of the invention, the reacting starting steroids of all examples have been listed in two separated Tables A and B and marked by a progressive number following the letter A or B. In Table A are listed the 17-hydroxy steroids or activated derivatives thereof, and in Table B are listed the 3-keto-steroids or their corresponding enol ethers or ketals.

TABLE A $A_1$ 17β-hydroxy-5α-androstan-3-one.
$A_2$ 17β-hydroxy-5β-androstan-3-one.
$A_3$ 17β-hydroxy-5α-androstan-1-en-3-one.
$A_4$ 17β-hydroxyandrost-4-en-3-one.
$A_5$ 17β-hydroxyandrosta-1,4-dien-3-one.
$A_6$ 5α-androstane-3β,17β-diol 3-acetate.
$A_7$ 5α-androstane-3α,17β-diol 3-acetate.
$A_8$ 5β-androstane-3α,17β-diol 3-acetate.
$A_9$ 5α-androst-1-ene-3β,17β-diol 3-acetate.
$A_{10}$ Androst-5-ene-3β,17β-diol 3-acetate.
$A_{11}$ 5α-androst-2-en-17β-ol.
$A_{12}$ 17β-hydroxyester-4-en-3-one.
$A_{13}$ 17β-hydroxy-1-methyl-5α-androst-1-en-3-one.
$A_{14}$ Estr-4-ene-3β,17β-diol 3-acetate.
$A_{15}$ 17β-hydroxy-5α-estran-3-one.
$A_{16}$ 17β-hydroxygon-4-en-3-one.
$A_{17}$ 5α-androstane-3α,17β-diol 3-enanthate.
$A_{18}$ 17β-cyclopent-1'-enyloxy-androst-5-en-3β-ol acetate.
$A_{19}$ 3α-methoxy-5α-androstan-17β-ol.

TABLE B $B_1$ 3,3-dimethoxy-5α-androstan-17β-ol acetate.
$B_2$ 3,3-dimethoxy-5β-androstan-17β-ol propionate.
$B_3$ 1,3,3-trimethoxy-5α-androstan-17β-ol acetate.
$B_4$ 3-methoxy-1-methyl-5α-androsta-1,3-dien-17β-ol acetate.
$B_5$ 3-ethoxyandrosta-3,5-dien-17-one.
$B_6$ 3-ethoxyandrosta-3,5-dien-17β-ol acetate.
$B_7$ 3-ethoxyandrosta-3,5-dien-17β-ol propionate.
$B_8$ 3-ethoxyandrosta-3,5-dien-17β-ol β-cyclopentylpropionate.
$B_9$ 3-ethoxyandrosta-3,5-dien-17β-ol benzoate.
$B_{10}$ 3-ethoxy-17α-methylandrosta-3,5-dien-17β-ol acetate.
$B_{11}$ 3-ethoxy-9α-fluoro-17α-methylandrosta-3,5-diene-11β,17β-diol acetate.
$B_{12}$ 3-ethoxyestra-3,5-dien-17-one.
$B_{13}$ 3-ethoxyestra-3,5-dien-17β-ol acetate.
$B_{14}$ 3-ethoxyestra-3,5-dien-17β-ol propionate.
$B_{15}$ 3-ethoxyestra-3,5-dien-17β-ol laurate.
$B_{16}$ 3-ethoxyestra-3,5-dien-17β-ol β-phenylpropionate.
$B_{17}$ 3-ethoxyestra-3,5-dien-17β-ol benzoate.
$B_{18}$ 3,3-dimethoxy-5α-pregnan-20-one.
$B_{19}$ 3,3-dimethoxy-5β-pregnan-20-one.
$B_{20}$ 3,3-dimethoxy-5β-pregnan-11,20-dione.
$B_{21}$ 3,3-dimethoxy-11β-hydroxy-5β-pregnan-20-one.
$B_{22}$ 3,3-dimethoxy-21-hydroxy-5β-pregnan-20-one acetate.
$B_{23}$ 3,3-dimethoxy-17α-hydroxy-5β-pregnane-11,20-dione acetate.
$B_{24}$ 1,3,3-trimethoxy-5α-pregnan-20-one.
$B_{25}$ 1,3,3-trimethoxy-17α-hydroxy-5α-pregnan-20-one acetate.
$B_{26}$ 3-ethoxypregna-3,5-dien-20-one.
$B_{27}$ 3-ethoxy-17α-hydroxypregna-3,5-dien-20-one acetate.
$B_{28}$ 3-ethoxy-17α-hydroxy-6-methylpregna-3,5-dien-20-one acetate.
$B_{29}$ 3-ethoxy-17α-hydroxy-6-chloropregna-3,5-dien-20-one acetate.
$B_{30}$ 3-ethoxy-17α-hydroxy-16-methylenepregna-3,5-dien-20-one acetate.
$B_{31}$ 3-ethoxy-16α,17α-(1'-methylbenzylidenedioxy)-pregna-3,5-dien-20-one.
$B_{32}$ 3-ethoxy-6α,21-dimethyl-17α-pregna-3,5-dien-20-yn-17β-ol acetate.
$B_{33}$ 3-ethoxy-19-norpregna-3,5-dien-20-one.
$B_{34}$ 3-ethoxy-17α-hydroxy-19-norpregna-3,5-dien-20-one acetate.
$B_{35}$ 3-ethoxy-17α-hydroxy-19-norpregna-3,5-dien-20-one n.hexanoate.
$B_{36}$ 3-ethoxy-17α-methylestra-3,5-dien-17β-ol acetate.
$B_{37}$ 3-ethoxy-19-nor-17α-pregna-3,5-dien-17β-ol acetate.
$B_{38}$ 3-ethoxy-19-nor-17α-pregna-3,5-dien-20-yn-17β-ol acetate.
$B_{39}$ 3-ethoxy-21-methylene-19-nor-17α-pregna-3,5,20-trien-17β-ol acetate.
$B_{40}$ 3-ethoxy-21-ethynyl-19-nor-17α-pregna-3,5-dien-20-yn-17β-ol acetate.
$B_{41}$ 3-ethoxy-13β-ethyl-17α-ethynylgona-3,5-dien-17β-ol acetate.
$B_{42}$ 3-ethoxy-17α,21-dihydroxypregna-3,5-diene-11,20-dione 21-acetate.
$B_{43}$ 3-ethoxy-11β,17α,21-trihydroxypregna-3,5-dien-20-one 21-acetate.
$B_{44}$ 3-ethoxy-9α-fluoro-11β,17α-21-trihydroxypregna-3,5-dien-20-one 21-acetate.
$B_{45}$ 3-ethoxy-9α-fluoro-11β,17α,21-trihydroxy-16β-methylpregna-3,5-dien-20-one 21-acetate.
$B_{46}$ 3-ethoxy-17α,21-dihydroxypregna-3,5-diene-11,20-dione 21-acetate.
$B_{47}$ 1α,3-dimethoxy-17α,21-dihydroxypregna-3,5-diene-11,20-dione 21-acetate.
$B_{48}$ 3-methoxy-11β,17α,21-trihydroxypregna-1,3,5-trien-20-one 21-acetate.
$B_{49}$ 3-methoxy-9α,11β-dichloro-17α,21-dihydroxypregna-1,3,5-trien-20-one 21-acetate.
$B_{50}$ 3-methoxy-9α,11β-dichloro-17α,21-dihydroxy-16α-methylpregna-1,3,5-trien-20-one 21-acetate.
$B_{51}$ 3-methoxy-9α,11β-dichloro-17α,21-dihydroxy-16β-methylpregna-1,3,5-trien-20-one 21-acetate.
$B_{52}$ 3-methoxy-9α-fluoro-11β,17α,21-trihydroxy-16α-methylpregna-1,3,5-trien-20-one 21-acetate.
$B_{53}$ 3-methoxy-9α-fluoro-11β,17α,21-trihydroxy-16α-methylpregna-1,3,5-trien-20-one 17,21-diacetate.
$B_{54}$ 3-methoxy-9α-fluoro-17α,21-dihydroxy-16α-methylpregna-1,3,5-triene-11,20-dione 17,21-diacetate.
$B_{55}$ 3-methoxy-9α-fluoro-11β,17α,21-trihydroxy-16β-methylpregna-1,3,5-trien-20-one 21-acetate.
$B_{56}$ 3-methoxy-9α-fluoro-11β,17α,21-trihydroxy-16β-methylpregna-1,3,5-trien-20-one 17,21-diacetate.
$B_{57}$ 3-methoxy-9α-fluoro-17α,21-dihydroxy-16β-methylpregna-1,3,5-triene-11,20-dione 21-acetate.
$B_{58}$ 3-methoxy-9α-fluoro-17α,21-dihydroxy-16β-methylpregna-1,3,5-triene-11,20-dione 17,21-diacetate.

B₅₉ 3-methoxy-9α-fluoro-11β,17α,21-trihydroxy-16-methylenepregna-1,3,5-trien-20-one 21-acetate.

B₆₀ 3-methoxy-9α-fluoro-17,21-dihydroxy-16-methylene-pregna-1,3,5-triene-11,20-dione 17,21-diacetate.

B₆₁ 3-methoxy-9α-fluoro-11β,21-dihydroxy-16α,17α-isopropylidenedioxy-pregna-1,3,5-trien-20-one 21-acetate.

B₆₂ 3-methoxy-9α-fluoro-16α,17α-isopropylidenedioxy-21-hydroxypregna-1,3,5-triene-11,20-dione 21-acetate.

B₆₃ 3-ethoxy-6α-fluoro-11β,21-dihydroxy-16α,17α-isopropylidenedioxy-pregna-3,5-dien-20-one 21-acetate.

B₆₄ 3-methoxy-6α-fluoro-16α,17α-isopropylidenedioxy-21-hydroxypregna-1,3,5-triene-11,20-dione 21-acetate.

B₆₅ 3-methoxy-6α-fluoro-11β,21-dihydroxy-16α,17α-isopropylidenedioxypregna-1,3,5-trien-20-one 21-acetate.

B₆₆ 3-methoxy-6α,9α-difluoro-11β,17α,21-trihydroxy-pregna-1,3,5-trien-20-one 17,21-diacetate.

B₆₇ 3-methoxy-6α,9α-difluoro-17α,21-dihydroxypregna-1,3,5-triene-11,20-dione 21-acetate.

B₆₈ 3-methoxy-6α,9α-difluoro-17α,21-dihydroxypregna-1,3,5-trien-11,20-dione 17,21-diacetate.

B₆₉ 3-methoxy-6α,9α-difluoro-11β,17α-dihydroxypregna-1,3,5-trien-20-one propionate [1]

B₇₀ 3-methoxy-6α,9α-difluoro-17α-hydroxypregna-1,3,5-triene-11,20-dione propionate.

B₇₁ 3-ethoxy-11β,18-oxido-18,21-dihydroxypregna-3,5-dien-20-one 18-benzoate 21-acetate.

B₇₂ 3-ethoxy-21-hydroxypregna-3,5-dien-20-one acetate.

B₇₃ 3-ethoxy-17α-pregna-3,5-dien-21,17β-carbolactone.

B₇₄ 3-ethoxy-7α-mercapto-17α-pregna-3,5-diene-21,17β-carbolactone acetate.

B₇₅ 3-ethoxy-19-nor-17α-pregna-3,5-diene-21,17β-carbolactone.

B₇₆ 3-ethoxy-7α-mercapto-19-nor-17α-pregna-3,5-diene-21,17β-carbolactone acetate.

B₇₇ 4′,5′-dihydrospiro-3-ethoxy-[androsta-3,5-diene-17,2′(3′,4)-furane]-7α-thiol acetate.

B₇₈ 3,3-dimethoxy-17α-hydroxy-5β-pregnan-20-one acetate.

B₇₉ 3-ethoxy-11β-methyl-19-nor-17α-pregna-3,5-dien-20-yn-17β-ol.

B₈₀ 3-methoxy-6α-fluoro-21-hydroxy-16α-methylpregna-1,3,5-triene-11,20-dione 21-acetate.

B₈₁ 3-methoxy-6α-fluoro-11,21-dihydroxy-16α-methyl-pregna-1,3,5-trien-20-one 21-acetate.

B₈₂ 17β-hydroxyestr-4-en-3-one acetate.

B₈₃ 17β-hydroxy-5α-androstan-3-one propionate.

EXAMPLE 1

17β-(11′,20′-dioxo-17′α-hydroxy-21′-acetoxypregna-3′,5′-dien-3′-yloxy)-androst-4-en-3-one 5 grams of cortisone 21-acetate 3-ethyl enol ether (B₄₆) were added to a boiling solution of 5.5 g. testosterone (A₄) and 60 mg. pyridine p-toluenesulfonate in 5000 ml. toluene. The mixture was refluxed and the solvent distilled for about 40 minutes, then 0.6 ml. pyridine were

[1] Preparation of corresponding 3-keto-Δ¹,⁴-steroid is carried out as follows: 10 g. of 6α,9α-difluoroprednisolone 17-propionate, described in British Pat. 1,202,001 Example 1, are dissolved in 100 ml. Pyridine : methylene chloride (1 : 1), cooled to 0° C. then 15 g. of p.toluenesulfonic acid—dissolved in 100 ml. pyridine :methylene chloride (1 :1) are added and the mixture is allowed to rest overnight at 0.5° C. 6α,9α-difluoro-11β,17α,21-trihydroxypregna-1,4-diene 17-propionate 21-tosylate melting at 205–207° C. thus obtained is dissolved in acetone, treated with 25 g. sodium iodide, refluxed for 24 hours; then 32, 75 ml. acetic acid are added and further refluxed for one hour. The mixture is diluted with a 10% aqueous sodium acid sulfite, concentrated under vacuum and extracted with methylene chloride. Removal of the solvent followed by recrystallization from methylene chloride ether afforded 7.4 g. of 6α,9α-difluoro-11β,17α-dihydroxy-1,4-diene-3,20-dione 17-propionate melting at 235–237° C.

added and the solvent was completely removed, under reduced pressure.

The residue, taken up with methanol and filtered, gives 6.2 g. 17β-(11′,20′-dioxo-17′α-hydroxy-21′-acetoxypregna-3′,5′-dien-3′-yloxy)-androst-4-en-3-one, melting at 250–255° C. By further recrystallization from methylene chloride-methanol a melting point of 265–268° C. was obtained; $[\alpha]_D^{24°} = +38°$ (c.=1%, dioxane).

In accordance with the above procedure the following disteroidyl ethers are obtained.

| Ex. | Name | Preparation from— |
|---|---|---|
| 2 | 17β-(17′β-propionoxyestra-3′,5′-dien-3′-yloxy)-androsta-1,4-dien-3-one. | A₅+B₁₄ |
| 3 | 17β-(17′β-benzoyloxyestra-3′,5′-dien-3′-yloxy)-androsta-1,4-dien-3-one. | A₅+B₁₇ |
| 4 | 17β-[17′β-(3′′-phenylpropionoxy)-estra-3′,5′-dien-3′-yloxy]-androsta-1,4-dien-3-one. | A₅+B₁₆ |
| 5 | 17β-(17′β-propionoxyandrosta-3′,5′-dien-3′-yloxy)-androst-4-en-3-one. | A₄+B₇ |
| 6 | 17β-[17′β-(3′′-cyclopentylpropionoxy)-androsta-3′,5′-dien-3′-yloxy]-androst-4-en-3-one. | A₄+B₈ |
| 7 | 17β-(17′β-benzoyloxyandrosta-3′-5′-dien-3′-yloxy)-androst-4-en-3-one. | A₄+B₉ |
| 8 | 17β-(17′β-acetoxyandrosta-3′,5′-dien-3′-yloxy)-androst-4-en-3-one. | A₄+B₆ |
| 9 | 17β-(17′β-benzoyloxyestra-3′,5′-dien-3′-yloxy)-5α-androstan-3α-ol acetate. | A₇+B₁₇ |
| 10 | 17β-(20′-oxo-21′-acetoxypregna-3′,5′-dien-3′-yloxy)-androst-4-en-3-one. | A₄+B₇₂ |
| 11 | 17β-(17′-oxoandrosta-3′,5′-dien-3′yloxy)-androst-5-en-3β-ol acetate. | A₁₀+B₅ |
| 12 | 17β-(17′β-acetoxy-17′α-methylandrosta-3′,5′-dien-3′-yloxy)-androst-4-en-3-one. | A₄+B₁₀ |
| 13 | 17β-(17′α-acetoxy-20′-oxo-6′-methylpregna-3′,5′-dien-3′-yloxy)-estr-4-en-3-one. | A₁₂+B₂₆ |
| 14 | 17β-(11′,20′-dioxo-17′α-hydroxy-21′-acetoxy-pregna-1′,3′,5′-trien-3′-yloxy)-androst-4-en-3-one. | A₄+B₄₇ |
| 15 | 17β-(11′,20′-dioxo-17′α-hydroxy-21′-acetoxy-pregna-1′,3′,5′-trien-3′-yloxy)-estr-4-en-3-one. | A₁₂+B₄₇ |
| 16 | 17β-(20′-oxopregna-3′,5′-dien-3′-yloxy)-androst-4-en-3-one. | A₄+B₂₈ |
| 17 | 17β-(17′β-acetoxy-13′β-ethyl-17′α-ethynylgona-3′,5′-dien-3′-yloxy)-androst-4-en-3-one. | A₄+B₄₁ |
| 18 | 17β-(6′-chloro-17′α-acetoxy-20′-oxopregna-3′,5′-dien-3′-yloxy)-5α-androst-1-en-3β-ol acetate. | A₉+B₂₉ |
| 19 | 17β-(20′-oxo-21′-acetoxy-5′β-preg-3′-en-3′-yloxy)-5β-androstan-3-one. | A₂+B₃₂ |
| 20 | 17β-(9′α-fluoro-11′β-hydroxy-17′α,21′-diacetoxy-20′-oxo-16′α-methylpregna-1′,3′,5′-trien-3′-yloxy)-estr-4-en-3-one. | A₁₂+B₅₃ |
| 21 | 17β-(9′α-fluoro-11′β-hydroxy-17′α,21′-diacetoxy-20′-oxopregna-1′,3′,5′-trien-3′-yloxy)-estr-4-en-3-one. | A₁₂+B₆₄ |
| 22 | 17β-(9′α-fluoro-11′,20′-dioxo-16′α,17′α-isopropylidenedioxy-21′-acetoxypregna-1′,3′,5′-trien-3′-yloxy)-5α-androst-1-en-3-one. | A₃+B₆₂ |
| 23 | 17β-(9′α-fluoro-11′-hydroxy-16′α,17′α-isopropylidenedioxy-20′-oxo-21′-acetoxypregna-1′,3′,5′-trien-3′-yloxy)-5β-androstan-3-one. | A₂+B₆₁ |
| 24 | 17β-(9′α,11′β-dichloro-17′α-hydroxy-20′-oxo-21′-acetoxypregna-1′,3′,5′-trien-3′-yloxy)-androsta-1,4-dien-3-one. | A₅+B₄₉ |
| 25 | 17β-(6′-fluoro-11′,20′-dioxo-21′-acetoxy-16′α-methylpregna-1′,3′,5′-trien-3′-yloxy)-androsta-1,4-dien-3-one. | A₅+B₆₀ |

EXAMPLE 26

17β-(17′β-acetoxy-5′α-androsta-1′,3′-dien-3′-yloxy)-androst-5-en-3β-ol acetate 4 grams of 1α,3α,3β-trimethoxy-5α-androstan-17β-ol acetate (B₃) were added to a boiling solution containing 4 g. 3β-acetoxyandrost-5-en-17β-ol (A₁₀) and 120 mg. pyridine p-toluenesulfonate in 1500 ml. benzene. The mixture was refluxed and the solvent distilled for 150 minutes. Then some drops of pyridine were added and the solvent was completely removed under reduced pressure.

The residue was taken up with methanol, filtered and crystallized from methylene chloride-methanol to give 4.36 g. 17β-(17′β-acetoxy - 5′α - androsta-1′,3′-dien-3′-yloxy)-androst-5-en-3β-ol acetate, melting at 223–229° C. By further recrystallization from the same mixture of solvents, 3.7 g. of product melting at 230–233° C. were obtained: $[\alpha]_D^{24°} = -8°$ (c.=1%, dioxane).

In accordance with the above procedure the following disteroidyl ethers are obtained.

| Ex. | Name | Preparation from— |
|---|---|---|
| 27 | 17β-(17'β-acetoxy-5'α-androsta-1',3'-dien-3'-yloxy)-5α-androst-1-en-one. | $A_3+B_3$ |
| 28 | 17β-(17'β-acetoxy-5'α-androsta-1',3'-dien-3'-yloxy)-5α-androst-1-en-3β-ol acetate. | $A_9+B_3$ |
| 29 | 17β-(17'α-acetoxy-20'-oxopregna-3',5'-dien-3'-yloxy)-5α-androstan-3-one. | $A_1+B_{27}$ |
| 30 | 17β-(11'β,18'-oxido-18'-benzoyloxy-20'-oxo-21'-acetoxypregna-3',5'-dien-3'-yloxy)-estr-4-en-3-one. | $A_{12}+B_{71}$ |
| 31 | 17β-(9'α-fluoro-11'β,17'α-dihydroxy-20'-oxo-21'-acetoxy-16'β-methylpregna-1',3',5'-trien-3'-yloxy)-estr-4-en-3-one. | $A_{12}+B_{55}$ |
| 32 | 17β-(9'α-fluoro-11'β,17'α-dihydroxy-20'-oxo-21'-acetoxy-16'α-methylpregna-1',3',5'-trien-3'-yloxy)-estr-4-en-3-one. | $A_{12}+B_{52}$ |
| 33 | 17β-(11'β,17'α-dihydroxy-20'-oxo-21'-acetoxy-pregna-1',3',5'-trien-3'-yloxy)-estr-4-en-3-one. | $A_{12}+B_{48}$ |
| 34 | 17β-(11'β,17'α-dihydroxy-20'-oxo-21'-acetoxy-pregna-3',5'-dien-3'-yloxy)-androst-4-en-3-one. | $A_4+B_{46}$ |
| 35 | 17β-(9'α-fluoro-11'β,17'α-dihydroxy-20'-oxo-21'-acetoxypregna-3',5'-dien-3'-yloxy)-5α-androst-1-en-3-one. | $A_3+B_{44}$ |
| 36 | 17β-(17'β-acetoxy-1'-methyl-5'α-androsta-1',3'-dien-3'-yloxy)-1-methyl-5α-androst-1-en-3-one. | $A_{13}+B_4$ |
| 37 | 17β-(9'α-fluoro-11'β-hydroxy-17'β-acetoxy-17'α-methylandrosta-3',5'-dien-3'-yloxy)-estr-4-en-3-one. | $A_{12}+B_{11}$ |
| 38 | 17β-(17'α-acetoxy-20'-oxo-16'-methylenpregna-3',5'-dien-3'-yloxy)-5α-androstan-3-one. | $A_3+B_{30}$ |
| 39 | 17β-(11'β,17'α-dihydroxy-20'-oxo-21'-acetoxy-pregna-3',5'-dien-3'-yloxy)-estr-4-en-3-one. | $A_{12}+B_{48}$ |
| 40 | 17β-(17'β-acetoxy-5'α-androst-2'-en-3'-yloxy)-5α-androstan-3-one. | $A_1+B_1$ |
| 41 | 17β-(17'β-acetoxy-5'α-androst-2'-en-3'-yloxy)-5α-androst-1-en-3-one. | $A_3+B_1$ |
| 42 | 17β-(9'α-fluoro-11'β,17'α-dihydroxy-20'-oxo-21'-acetoxy-16'β-methylpregna-3',5'-dien-3'-yloxy)-estr-4-en-3-one. | $A_{12}+B_{45}$ |
| 43 | 17β-(20'-oxo-5'β-pregn-3'-en-3'-yloxy)-5β-androstan-3-one. | $A_2+B_{19}$ |
| 44 | 17β-(11',20'-dioxo-5'β-pregn-3'-en-3'-yloxy)-5β-androstan-3-one. | $A_2+B_{20}$ |
| 45 | 17β-(11',20'-dioxo-17'α-acetoxy-5'β-pregn-3'-en-3'-yloxy)-5β-androstan-3-one. | $A_2+B_{23}$ |
| 46 | 17β-(20'-oxo-17'α-acetoxy-5'β-pregn-3'-en-3'-yloxy)-5β-androstan-3-one. | $A_2+B_{78}$ |
| 47 | 17β-(11',20'-dioxo-5'β-pregn-3'-en-3'-yloxy)-estr-4-en-3β-ol acetate. | $A_{14}+B_{20}$ |
| 48 | 17β-(20'-oxo-11'β-hydroxy-5'β-pregn-3'-en-3'-yloxy)-5α-androst-1-en-3-one. | $A_3+B_{21}$ |
| 49 | 17β-(20'-oxo-5'α-pregn-1',3'-dien-3'-yloxy)-5β-androstan-3α-ol acetate. | $A_5+B_{24}$ |
| 50 | 17β-(20'-oxo-17'α-acetoxy-5'α-pregna-1',3'-dien-3'-yloxy)-5α-androstan-3-one. | $A_1+B_{25}$ |
| 51 | 17β-(17'β-acetoxy-21'-methylene-19'-nor-17'α-prenga-3',5',20'-trien-3'-yloxy)-5β-androstan-3α-ol acetate. | $A_8+B_{39}$ |
| 52 | 17β-(17'-oxoestra-3',5'-dien-3'-yloxy)-estr-4-en-3β-ol acetate. | $A_{14}+B_{12}$ |
| 53 | 17β-(17'β-acetoxy-19'-nor-17'α-pregna-3',5'-dien-20'-yn-3'-yloxy)-5β-androstan-3α-ol acetate. | $A_8+B_{40}$ |
| 54 | 17β-(17'β-acetoxy-19'-nor-17'α-pregna-3',5'-dien-20'-yn-3'-yloxy)-5β-androstan-3-one. | $A_2+B_{38}$ |
| 55 | 17β-(9'α-fluoro-11',20'-dioxo-17'α-hydroxy-21'-acetoxy-16'β-methylpregna-1',3',5'-trien-3'-yloxy)-estr-4-en-3-one. | $A_{12}+B_{57}$ |
| 56 | 17β-(9'α-fluoro-11',20'-dioxo-17'α,21'-diacetoxy-16'β-methylpregna-1',3',5'-trien-3'yloxy)-estr-4-en-3-one. | $A_{12}+B_{58}$ |
| 57 | 17β-(9'α-fluoro-11'β-hydroxy-17'α,21'-diacetoxy-20'-oxo-16'β-methylpregna-1',3',5'-trien-3'-yloxy)-estr-4-en-3-one. | $A_{12}+B_{54}$ |
| 58 | 17β-(9'α-fluoro-11',20'-dioxo-17'α-hydroxy-21'-acetoxy-16'β-methylpregna-1',3',5'-trien-3'-yloxy)-5β-androstan-3-one. | $A_2+B_{57}$ |
| 59 | 17β-(9'α-fluoro-11'β,17'α-dihydroxy-20'-oxo-21'-acetoxy-16'β-methylpregna-1',3',5'-trien-3'-yloxy)-5β-androstan-3-one. | $A_2+B_{55}$ |
| 60 | 17β-(9'α-fluoro-11'β-hydroxy-17'α,21'-diacetoxy-20'-oxo-16'β-methylpregna-1',3',5'-trien-3'-yloxy)-5α-androst-1-en-3-one. | $A_3+B_{57}$ |
| 61 | 17β-(9'α-fluoro-11'β,17'α-dihydroxy-20'-oxo-21'-acetoxy-16'β-methylpregna-1',3',5'-trien-3'-yloxy)-5α-androstan-3-one. | $A_1+B_{55}$ |
| 62 | 17β-(9'α-fluoro-11',20'-dioxo-17'α,21'-diacetoxy-16'α-methylpregna-1',3',5'-trien-3'-yloxy)-estr-4-en-3-one. | $A_{12}+B_{54}$ |
| 63 | 17β-(6'α,9'α-difluoro-11',20'-dioxo-17'α-propionoxypregna-1',3',5'-trien-3'-yloxy)-estr-4-en-3-one. | $A_{12}+B_{70}$ |
| 64 | 17β-(6'α,9'α-difluoro-11'β-hydroxy-17'α-propionoxy-20'-oxo-pregna-1',3',5'-trien-3'-yloxy)-estr-4-en-3-one. | $A_{12}+B_{69}$ |
| 65 | 17β-(6'α,9'α-difluoro-11',20'-dioxo-17'α,21'-diacetoxypregna-1',3',5'-trien-3'-yloxy)-estr-4-en-3-one. | $A_{12}+B_{68}$ |
| 66 | 17β-(6'α,9'α-difluoro-11',20'-dioxo-17'α-hydroxy-21'-acetoxypregna-1',3',5'-trien-3'-yloxy)-estr-4-en-3-one. | $A_{12}+B_{67}$ |
| 67 | 17β-(9'α,11'β-dichloro-17'α-hydroxy-20'-oxo-21'-acetoxy-16'β-methylpregna-1',3',5'-trien-3'-yloxy)-estr-4-en-3-one. | $A_{12}+B_{51}$ |
| 68 | 17β-(9'α,11'β-dichloro-17'α-hydroxy-20'-oxo-21'-acetoxy-16'α-methylpregna-1',3',5'-trien-3'-yloxy)-5α-androst-1-en-3-one. | $A_3+B_{50}$ |
| 69 | 17β-(9α'-fluoro-11',20'-dioxo-17'α,21'-diacetoxy-16'-methylenepregna-1',3',5'-trien-3'-yloxy)-estr-4-en-3-one. | $A_{12}+B_{60}$ |
| 70 | 17β-(9'α-fluoro-11'β,17'α-dihydroxy-20'-oxo-21'-acetoxy-16'-methylenepregna-1',3',5'-trien-3'-yloxy)-5β-androstan-3-one. | $A_2+B_{59}$ |
| 71 | 17β-(6'α-fluoro-11'β-hydroxy-16'α,17'α-isopropylidenedioxy-20'-oxo-21'-acetoxypregna-3',5'-dien-3'-yloxy)-5α-androst-1-en-3-one. | $A_3+B_{63}$ |
| 72 | 17β-(6'α-fluoro-11',20'-dioxo-16'α,17'α-isopropylidenedioxy-21'-acetoxypregna-1',3',5'-trien-3'-yloxy)-5α-androst-1-en-3-one. | $A_3+B_{64}$ |
| 73 | 17β-(6'α-fluoro-11'β-hydroxy-16'α,17'α-isopropylidenedioxy-20'-oxo-21'-acetoxypregna-1',3',5'-trien-3'-yloxy)-5α-androst-1-en-3β-ol acetate. | $A_9+B_{65}$ |
| 74 | 17β-(6'α-fluoro-11'β-hydroxy-20'-oxo-21'-acetoxy-16'α-methylpregna-1',3',5'-trien-3'-yloxy)-androsta-1,4-dien-3-one. | $A_5+B_{81}$ |
| 75 | 3-(3'-oxoestr-4'-en-17'β-yloxy)-7α-mercapto-17α-pregna-3,5-diene-21,17β-carbolactone acetate. | $A_{12}+B_{74}$ |
| 76 | 3-(3'-oxo-5'α-estran-17'β-yloxy)-7α-mercapto-17α-pregna-3,5-diene-21,17β-carbolactone acetate. | $A_{15}+B_{74}$ |
| 77 | 3-(3'-oxogon-4'-en-17'β-yloxy)-7α-mercapto-17α-pregna-3,5-diene-21,17β-carbolactone acetate. | $A_{16}+B_{74}$ |
| 78 | 3-(3'-oxoestr-4'-en-17'β-yloxy)-7α-mercapto-19-nor-17α-pregna-3,5-diene-21,17β-carbolactone acetate. | $A_{12}+B_{76}$ |
| 79 | 3-(3'-oxogon-4'-en-17'β-yloxy)-7α-mercapto-19-nor-17α-pregna-3,5-diene-21,17β-carbolactone acetate. | $A_{16}+B_{76}$ |
| 80 | 4',5'-dihydrospiro[3-(3''-oxoestr-4''-en-17''β-yloxy)-androsta-3,5-diene-17,2'(3'4)-furane]-7α-thiol acetate. | $A_{12}+B_{77}$ |
| 81 | 4',5'-dihydrospiro[3-(3''-oxogon-4''-en-17''β-yloxy)-androsta-3,5-diene-17,2'(3'4)-furane]-7α-thiol acetate. | $A_{16}+B_{77}$ |
| 82 | 17β-(9'α-fluoro-11'β,17'α-dihydroxy-20'-oxo-21'-acetoxy-16'β-methylpregna-1',3',5'-trien-3'-yloxy)-5α-androstan-3α-ol enanthate. | $A_{17}+B_{55}$ |
| 83 | 17β-(9'α-fluoro-17'α,21'-dihydroxy-11',20'-dioxo-21'-acetoxy-16'β-methlpregna-1',3',5'-trien-3'-yloxy)-5α-androstan-3α-ol-methyl ether. | $A_{19}+B_{57}$ |

EXAMPLE 84

17β-(17'β-propionoxy-5'-α-androst-2'-en-3'-yloxy)-androst-5-en 3β-ol acetate

A mixture of 5 g. androstanolone 17 propionate 3,3-dimethylacetal ($B_2$) and 5 g. 3β-acetoxyandrost-5-en-17β-ol ($A_{10}$) in 30 ml. dimethylformamide was treated with p-toluenesulfonic acid and then heated on an oil bath to 120–150° C. for 40 minutes and to 180–200° C. for 20 minutes. Then some drops of pyridine were added, the solvent completely removed under reduced pressure, and the residue taken up with methanol, filtered and crystallized from methylene chloride-methanol to give 5 g. 17β-(17'β-propionoxy-5'α-androst - 2' - en-3'-yloxy)-androst-5-en-3β-ol acetate, melting at 224–226° C.; $[\alpha]_D^{24°} = +3°$ (c.=1%, dioxane).

In accordance with the above procedure the following disteroidyl ethers are obtained.

| Ex. | Name | Preparation from— |
|---|---|---|
| 85 | 17β-(17'β-acetoxy-5'α-androst-2'-en-3'-yloxy)-androsta-1,4-dien-3-one. | $A_5+B_1$ |
| 86 | 17β-(17'β-acetoxy-19'-nor-17'α-pregna-3',5'-dien-20'-yn-3'-yloxy)-androst-5-en-3-ol acetate. | $A_{10}+B_{38}$ |
| 87 | 17β-(17'β-propionoxyestra-3',5'-dien-3'-yloxy)-5α-androst-2-ene. | $A_{11}+B_{14}$ |
| 88 | 17β-(17'β-propionoxyandrost-3'-en-3'-yloxy)-androsta-1,4-dien-3-one. | $A_5+B_2$ |
| 89 | 17β-(11',20'-dioxo-17'α-acetoxy-5'β-pregn-3'-en-3'-yloxy)-5β-androstan-3α-ol acetate. | $A_8+B_{23}$ |
| 90 | 17β-(20'-oxo-5'α-pregn-2'-en-3'-yloxy)-5β-androstan-3α-ol acetate. | $A_8+B_{18}$ |
| 91 | 17β-(17'-oxoestra-3',5'-dien-3'-yloxy)-androst-5-en-3β-ol acetate. | $A_{10}+B_{12}$ |
| 92 | 17β-(17'-oxoestra-3',5'-dien-3'-yloxy)-5β-androstan-3α-ol acetate. | $A_8+B_{12}$ |
| 93 | 17β-(17'β-acetoxy-6'α,21'-dimethyl-17'α-pregna-3',5'-dien-20'-yn-3'-yloxy)-androst-5-en-3β-ol-acetate. | $A_{10}+B_{32}$ |

EXAMPLE 94

17β-(17'β-acetoxyestra-3',5'-dien-3'-yloxy)-androst-5-en 3β-ol acetate

A mixture of 2 g. 17β-(cyclopent-1'-enyloxy)-androst-5-en-3β-ol acetate ($A_{18}$) and 2 g. 19-nortestosterone acetate ($B_{82}$) in 20 ml. dimethylformamide was treated with 20 mg. p-toluenesulfonic acid and then heated on an oil bath to 120–150° C. for 40 minutes and to 180–200° C. for 30 minutes. During this last period, the reaction mixture was bubbled with a light nitrogen stream, then a few drops of pyridine were added and the solvent was removed under reduced pressure and the residue taken up with methanol and filtered to give 1.28 g. 17β-(17'β-acetoxyestra-3',5'-dien-3'-yloxy)-androst-5-en-3β-ol acetate, meltting at 220–226° C. By further recrystallization from methylene chloride-methanol 1.1 g. of the compound having a melting point of 230–233° C. was obtained; $[\alpha]_D^{24°} = -113°$ C. (c.=1%, dioxane).

In accordance with the above procedure the following disteroidyl ethers are obtained.

| Ex. | Name | Preparation from— |
|---|---|---|
| 95 | 17β-(17'β-propionoxy-5'α-androst-2'-en-3'-yloxy)-androst-5-en-3β-ol acetate. | $A_{18}+B_{83}$ |
| 96 | 17β-(17'β-propionoxyandrosta-3',5'-dien-3'-yloxy)-androst-5-en-3β-ol acetate. | $A_{18}+B_7$ |

EXAMPLE 97

17β-(17'β-propionoxyestra-3',5'-dien-3'-yloxy)-estra-4-en-3-one 12 grams of 19-nortestosterone 17-propionate 3-ethyl enol ether ($B_{14}$) were added to a boiling solution of 12 g. 19-nortestosterone ($A_{12}$) and 0.8 g. pyridine p-toluenesulfonate in 9 l. toluene. The mixture was refluxed and the solvent was distilled for about 55 minutes. Then 1 ml. pyridine was added and the solvent completely removed under reduced pressure. The residue was taken up with methanol and filtered to give 16.35 g. 17β-(17'β-propionoxyestra-3',5'-dien - 3' - yloxy)-estra-4-en-3-one, melting at 177–184° C. By further recrystallization from ethylene chloride-ethanol a melting point of 185–188° C. was obtained; $[\alpha]_D^{24°} = -91.5°$ (c.=1%, dioxane).

In accordance with the above procedure the following disteroidyl ethers are obtained.

| Ex. | Name | Preparation from— |
|---|---|---|
| 98 | 17β-(17'β-benzoyloxyestra-3',5'-dien-3'-yloxy)-estr-4-en-3-one. | $A_{12}+B_{17}$ |
| 99 | 17β-[17'β-(3''-phenylpropionoxy)-estra-3',5'-dien-3'-yloxy]-estr-4-en-3-one. | $A_{12}+B_{18}$ |
| 100 | 17β-(17'β-lauryloxyestra-3',5'-dien-3'-yloxy)-estr-4-en-3-one. | $A_{12}+B_{15}$ |
| 101 | 17β-(17'β-propionoxyandrosta-3',5'-dien-3'-yloxy)-estr-4-en-3-one. | $A_{12}+B_7$ |
| 102 | 17β-(17'β-propionoxyestra-3',5'-dien-3'-yloxy)-androst-4-en-3-one. | $A_4+B_{14}$ |
| 103 | 17β-(17'α-acetoxy-19'-nor-17'α-pregna-3',5'-dien-20'-yn-3'-yloxy)-androst-4-en-3-one. | $A_4+B_{38}$ |
| 104 | 17β-(17'α-acetoxy-19'-nor-17'α-pregna-3',5'-dien-20'-yn-3'-yloxy)-estr-4-en-3-one. | $A_{12}+B_{38}$ |
| 105 | 17β-(20'-oxo-19'-norpregna-3',5'-dien-3'-yloxy)-estr-4-en-3-one. | $A_{12}+B_{33}$ |
| 106 | 17β-(17'α-acetoxy-19'-nor-20'-oxopregna-3',5'-dien-3'-yloxy)-estr-4-en-3-one. | $A_{12}+B_{34}$ |
| 107 | 17β-(17'β-acetoxy-17'α-ethylestra-3',5'-dien-3'-yloxy)-estr-4-en-3-one. | $A_{12}+B_{37}$ |
| 108 | 17β-[16'α,17'α-(1''-methyl)-benzylidenedioxy-20'-oxopregna-3',5'-dien-3'-yloxy]-estr-4-en-3-one. | $A_{12}+B_{31}$ |
| 109 | 17β-(11',20'-dioxo-5'β-pregn-3'-en-3'-yloxy)-estr-4-en-3-one. | $A_{12}+B_{20}$ |
| 110 | 17β-(20'-oxo-17'α-acetoxy-19'-norpregna-3',5'-dien-3'-yloxy)-estr-4-en-3-one. | $A_{12}+B_{34}$ |
| 111 | 17β-(20'-oxo-17'α-caproyloxy-19'-norpregna-3',5'-dien-3'-yloxy)-androst-5-en-3β-ol acetate. | $A_{10}+B_{35}$ |
| 112 | 17β-(17'β-hydroxy-11'β-methyl-19'-nor-17'α-pregna-3',5'-dien-20'-yn-3'-yloxy)-androst-5-en-3β-ol acetate. | $A_{10}+B_{70}$ |
| 113 | 17β-(17'β-hydroxy-11'β-methyl-19'-nor-17'α-pregna-3',5'-dien-20'-yn-3'-yloxy)-5β-androstan-3-one. | $A_2+B_{70}$ |
| 114 | 17β-(17'β-hydroxy-11'β-methyl-19'-nor-17'α-pregna-3',5'-dien-20'-yn-3'-yloxy)-estr-4-en-3-one. | $A_{12}+B_{70}$ |
| 115 | 3-(3'-oxoestr-4'-en-17'β-yloxy)-17α-pregna-3,5-diene-21,17β-carbolactone. | $A_{12}+B_{73}$ |
| 116 | 3-(3'-oxo-5'α-estran-17'β-yloxy)-19-nor-17α-pregna-3,5-diene-21,17β-carbolactone. | $A_{18}+B_{75}$ |

EXAMPLE 117

17β-(17'β-hydroxestra-3',5'-dien-3'-yloxy)-estr-4-en-3-one 1 gram of 17β-(17'β-propionoxyestra-3'-5'-dien-3'-yloxy)-estr-4-en-3-one (Ex. 97) in 50 ml. methanol and 25 ml. methylene chloride was added to 7 ml. of a 5% ethanolic potassium hydroxide solution and refluxed for 4 and a half hours in nitrogen atmosphere. After concentration under reduced pressure the mixture was poured into water to obtain 17β-(17'β-hydroxyestra-3',5'-dien-3'-yloxy)-estr-4-en-3-one as white solid which, recrystallized from ethylene chloridemethanol, melts at 250–253° C.; $[\alpha]_D^{24°} = -95°$ (c.=1%, dioxane).

In accordance with the above procedure the following disteridyl ethers are obtained.

| Ex. | Name | Preparation from— |
|---|---|---|
| 118 | 17β-(17'β-hydroxyandrosta-3',5'-dien-3'-yloxy)-androst-4-en-3-one. | End-product Ex. 8. |
| 119 | 17β-(17'β-hydroxy-17'α-methylandrosta-3',5'-dien-3'-yloxy)-androst-4-en-3-one. | End-product Ex. 12. |
| 120 | 17β-(17'β-hydroxy-13'β-ethyl-17'α-ethynylgona-3',5'-dien-3'-yloxy)-androst-4-en-3-one. | End-product Ex. 17. |
| 121 | 17β-(9'α-fluoro-11'β,17'β-dihydroxy-17'α-methylandrosta-3',5'-dien-3'-yloxy)-estr-4-en-3-one. | End-product Ex. 37. |
| 122 | 17β-(17'β-hydroxy-17'α-ethylestra-3',5'-dien-3'-yloxy)-estr-4-en-3-one. | End-product Ex. 107. |
| 123 | 17β-(17'β-hydroxy-21'-methylene-19'-nor-17'α-pregna-3',5'-20'-trien-3'-yloxy)-5β-androstan-3α-ol. | End-product Ex. 51. |
| 124 | 17β-(17'β-hydroxy-21'-ethynyl-19'-nor-17'α-pregna-3',5'-dien-20'-yn-3'-yloxy)-5β-androstan-3α-ol. | End-product Ex. 53. |
| 125 | 17β-(17'β-hydroxy-19'-nor-17'α-pregna-3',5'-dien-20'-yn-3'-yloxy)-estr-4-en-3-one. | End-product Ex. 104. |
| 126 | 17β-(17'β-hydroxy-19'-nor-17'α-pregna-3',5'-dien-20'-yn-3'-yloxy)-androst-5-en-3β-ol. | End-product Ex. 86. |
| 127 | 17β-(17'β-hydroxy-19'-nor-17'α-pregna-3',5'-dien-20'-yn-3'-yloxy)-5β-androstan-3-one. | End-product Ex. 54. |
| 128 | 17β-(17'β-hydroxy-11'β-methyl-19'-nor-17'α-pregna-3',5'-dien-20'-yn-3'-yloxy)-androst-5-en-3β-ol. | End-product Ex. 112. |

EXAMPLE 129

17β-(17'β-hydroxyestra-3',5'-dien-3'-yloxy)-estr-4-en-3-one sulfate, sodium salt In a flask provided with a stopper, 9.4 ml. anhydrous pyridine and 0.42 ml. acetic anhydride were added to 0.731 g. anhydrous sulfate pyridine and the mixture was stirred for 30 minutes. A solution of 1 g. 17β-(17'β-hydroxyestra - 3',5' - dien - 3' - yloxy)-estr - 4 - en - 3 - one in 10 ml. pyridine was added and the mixture kept under stirring overnight at room temperature. The contents of the flask were evaporated under reduced pressure at 40° C. and the residue was taken up with water, adjusted to a pH 11–12 with a 5% aqueous solution of sodium hydrate and extracted with successive portions of n.butanol. Then butanol was removed by a short heating and the residue, taken up with ether, gives 1 g. 17β - (17'β - hydroxyestra-3',5'-dien-3'-yloxy)-estr-4-en-3-one sulfate crude sodium salt which can be purified from methano-ethyl ether; $[\alpha]_D^{24°} = -82.6°$ (c.=1%, ethanol 95°).

In accordance with the above procedure the following disteroidyl ethers are obtained.

| Ex. | Name | Preparation from— |
|---|---|---|
| 130 | 17β-(11',20'-dioxo-17'α-acetoxy-5'β-pregn-3'-en-3'-yloxy)-5β-androstan-3α-ol sulfate sodium salt. | End-product Ex. 186. |
| 131 | 17β-(17'β-hydroxy-19'-nor-17'α-pregna-3',5'-dien-20'-yn-3'-yloxy)-estr-4-en-3-one 17'-sulfate sodium salt. | End-product Ex. 125. |
| 132 | 17β-(17'β-hydroxy-19'-nor-17'α-pregna-3',5'-dien-20'-yn-3'-yloxy)-5β-androstan-3-one17'-sulfate sodium salt. | End-product Ex. 127. |
| 133 | 17β-(9'α-fluoro-11',20'-dioxo-17'α,21'-dihydroxy-16'β-methylpregna-1',3',5'-trien-3'-yloxy)-ester-4-en-3-one 21'-sulfate sodium salt. | End-product Ex. 158. |

EXAMPLE 134

17β-(17'β-Hemisuccinoxyestra-3',5'-dien-3'-yloxy)-estr-4-en-3-one

A solution of 3 g. 17β-(17'β-hydroxyestra - 3',5' - dien-3'-yloxy)-estr-4-en-3-one (Ex. 117) was treated with 9 g. succinic anhydride and kept at 60° C. for 48 hours. The mixture was poured into ice-water and the product precipitated by addition of diluted hydrochloric acid. Extraction with ether gave, after removal of the solvent under reduced pressure and recrystallization of the residue from ether, 2.85 g. of 17β-(17'β-hemisuccinoxyestra-3',5'-dien-3'-yloxy)-estr-4-en-3-one, melting at 175–180° C. (dec.), $[\alpha]_D = -89°$ (c.=1%, dioxane).

In accordance with the above procedure, using phthalic anhydride or succinic anhydride, the following disteroidyl ethers are obtained.

| Ex. | Name | Preparation from— |
|---|---|---|
| 135 | 17β-(17'β-hydroxyandrosta-3',5'-dien-3'-yloxy)-androst-4-en-3-one hemisuccinate. | End-product Ex. 118. |
| 136 | 17β-(17'β-hydroxy-5'α-androst-2'-en-3'-yloxy)-5α-androst-1-en-3-one hemisuccinate. | End-product Ex. 190. |
| 137 | 17β-(11',20'-dioxo-5'β-pregn-3'-en-3'-yloxy)-estr-4-en-3β-ol hemisuccinate. | End-product Ex. 185. |
| 138 | 17β-(20'-oxo-5'α-pregn-2'-en-3'-yloxy)-5β-androstan-3α-ol hemisuccinate. | End-product Ex. 187. |
| 139 | 17β-(20'-oxo-5'α-pregna-1',3'-dien-3'-yloxy)-5β-androstan-3α-ol hemisuccinate. | End-product Ex. 188. |
| 140 | 17β-(20'-oxo-17'α-acetoxy-5'α-pregna-1',3'-dien-3'-yloxy)-5α-androstan-3β-ol hemisuccinate. | End-product Ex. 192. |
| 141 | 17β-(17'β-hydroxy-21'-methylene-19'-nor-17'α-pregna-3',5'-dien-3'-yloxy)-androst-5-en-3β-ol β-hemisuccinate. | End-product Ex. 153. |
| 142 | 17β-(17'β-hydroxy-21'-methylene-19'-nor-17'α-pregna-3',5'-dien-3'-yloxy)-5β-androstan-3α-ol 3-hemiphthalate. | End-product Ex. 154. |
| 143 | 17β-(17'β-hydroxy-21'-methyl-21'-methylene-19'-nor-17'α-pregna-3',5'-dien-3'-yloxy)-androst-5-en-3β-ol 3-hemisuccinate. | End-product Ex. 155. |
| 144 | 17β-(17'β-hydroxy-21'-methylene-19'-nor-17'α-pregna-3',5',20'-trien-3'-yloxy)-5β-androstan-3α-ol 3-hemisuccinate. | End-product Ex. 123. |
| 145 | 17β-(17'β-hydroxy-21'-ethynyl-19'-nor-17'α-pregna-3',5'-dien-20'-yn-3'-yloxy)-5β-androstan-3α-ol 3-hemisuccinate. | End-product Ex. 124. |
| 146 | 17β-(17'β-hydroxy-19'-nor-17'α-pregna-3',5'-dien-20'-yn-3'-yloxy)-estr-4-en-3β-ol 3-hemiphthalate. | End-product Ex. 193. |
| 147 | 17β-(17'β-hydroxy-19'-nor-17'α-pregna-3',5'-dien-20'-yn-3'-yloxy)-androst-5-en-3β-ol 3-hemisuccinate. | End-product Ex. 126. |
| 148 | 17β-(20'-oxo-17'α-acetoxy-19'-norpregna-3',5'-dien-3'-yloxy)-estr-4-en-3β-ol hemisuccinate. | End-product Ex. 195. |
| 149 | 17β-(17'β-hydroxy-11'β-methyl-19'-nor-17'α-pregna-3',5'-dien-20'-yn-3'-yloxy)-androst-5-en-3β-ol 3-hemisuccinate. | End-product Ex. 128. |
| 150 | 17β-(6'α,9'α-difluoro-11'β-hydroxy-17'α-propionoxy-20'-oxopregna-1',3',5'-trien-3'-yloxy)-estr-4-en-3β-ol 3-hemisuccinate. | End-product Ex. 64. |

EXAMPLE 151

17β-(17'β-hydroxy-17'α-methylandrosta-3',5'-dien-3'-yloxy)-androst-5-en-3β-ol

A solution of 5 g. 17β-(17'-oxoandrosta-3',5'-dien-3'-yloxy)-androst-5-en-3β-ol acetate. (Ex. 11) in 100 ml. anhydrous tetrahydrofuran was added to 200 ml. of tetrahydrofuran solution of methylmagnesium bromide prepared from 20 g. magnesium and 100 g. methylbromide. The mixture was refluxed for 6 hours and then decomposed with satured ammonium chloride. Extraction with ether, followed by removal of the solvents under reduced pressure, and recrystallization of the residue from methylene chloride-acetone, afforded 3.5 g. of crystals of 17β-(17'β - hydroxy - 17'α - methylandrosta - 3',5' - dien-3'-yloxy)-androst - 5 - en-3β-ol, melting at 232–235° C., $[\alpha]_D = -74.5°$ (c.=1%, dioxane).

In accordance with the above procedure using a suitable alkylmagnesium halide, following disteroidyl ethers are obtained.

| Ex. | Name | Preparation from— |
|---|---|---|
| 152 | 17β-(17'β-hydroxy-17'α-methylandrosta-3',5'-dien-3'-yloxy)-estr-4-en-3β-ol. | End-product Ex. 52. |
| 153 | 17β-(17'β-hydroxy-21'-methylene-19'-nor-17'α-pregna-3',5'-dien-3'-yloxy)-androst-5-en-3β-ol. | End-product Ex. 91 plus BrMgCH₂—CH=CH₂ |
| 154 | 17β-(17'β-hydroxy-21'-methylene-19'-nor-17'α-pregna-3',5'-dien-3'-yloxy)-5β-androstan-3α-ol. | End-product Ex. 92 plus BrMgCH₂—CH=CH₂. |
| 155 | 17β-(17'β-hydroxy-21'-methyl-21'-methylene-19'-nor-17'α-pregna-3',5'-dien-3'-yloxy)-androst-5-en-3β-ol. | End-product Ex. 91 plus CH₃ ClMg CH₂—C≡CH. |
| 156 | 17β-(17'β-hydroxy-21'methyne-19'-nor-17'α-pregna-3',5'-dien-3'-yloxy)-androst-5-en-3β-ol. | End-product Ex. 91 plus BrMgCH₂—C≡CH. |
| 157 | 17β-(17'β-hydroxy-21'-methyne-19'-nor-17'α-pregna-3',5'-dien-3'-yloxy)-estr-4-en-3β-ol. | End-product Ex. 52 plus BrMgCH₂—C≡CH. |

EXAMPLE 158

17β-(9'α-fluoro-11',20'-dioxo-17'α,21'-dihydroxy-16'β-methylpregna-1',3',5'-trien-3',yloxy)-estr-4-en-3-one A solution of 1.86 g. of 17β-(9'α-fluoro-11',20'-dioxo-17'α-hydroxy-21'-acetoxy - 16'β - methylpregna - 1',3',5'-trien-3'-yloxy)-estr-4-en-3-one (Ex. 55) in 90 ml. of tetrahydrofuran and 90 ml. of methanol kept under nitrogen, was treated with 1.86 ml. of 1 M methanol solution of sodium methoxide. After stirring at room temperature for 20 minutes, the solvent was evaporated under reduced pressure and the residue taken up with water and filtered. A crystallization from methylene chloride-methanol gave 1.24 g. of crystals of 17β-(9'α-fluoro-11',20'-dioxo-17'α, 21' - dihydroxy - 16'β - methylpregna - 1',3',5'-trien-3'-yloxy) - estr - 4 - en - 3 - one, melting at 259–262° C. $[\alpha]_D = -68°$ (c.=1%, dioxane).

In accordance with the above procedure the following disteroidyl ethers are obtained.

| Ex. | Name | Preparation from— |
|---|---|---|
| 159 | 17β-(20'-oxo-21'-hydroxy-5'β-pregn-3'-en-3'-yloxy)-5β-androstan-3-one. | End-product Ex. 19. |
| 160 | 17β-(9'α-fluoro-11'β,17'α,21'-trihydroxy-20'-oxo-16'β-methylpregna-1',3',5'-dien-3'-yloxy)-estr-4-en-3-one. | End-product Ex. 42. |
| 161 | 17β-(9'α-fluoro-11'β,17'α,21'-trihydroxy-20'-oxo-16'β-methylpregna-1',3',5'-trien-3'-yloxy)-estr-4-en-3-one. | End-product Ex. 57 |
| 162 | 17β-(9'α-fluoro-11',20'-dioxo-17'α,21'-dihydroxy-16'β-methylpregna-1',3',5'-trien-3'-yloxy)-5β-androstan-3-one. | End-product Ex. 58. |
| 163 | 17β-(9'α-fluoro-11'β,17'α,21'-trihydroxy-20'-oxo-16'β-methylpregna-1',3',5'-trien-3'-yloxy)-5β-androstan-3-one. | End-product Ex. 59. |
| 164 | 17β-(9'α-fluoro-11',20'-dioxo-17'α,21'-dihydroxy-16'β-methylpregna-1',3',5'-trien-3'-yloxy)-5α-androst-1-en-3-one. | End-product Ex. 60. |
| 165 | 17β-(9'α-fluoro-11'β,17'α,21'-trihydroxy-20'-oxo-16'β-methylpregna-1',3',5'-trien-3'-yloxy)-5α-androxtan-3-one. | End-product Ex. 61. |
| 166 | 17β-(9'α-fluoro-11'β,17'α,21'-trihydroxy-20'-oxo-16'α-methylpregna-1',3',5'-trien-3'-yloxy)-estr-4-en-3-one. | End-product Ex. 20. |
| 167 | 17β-(9'α-fluoro-11',20'-dioxo-17'α,21'-dihydroxy-16'α-methylpregna-1',3',5'-trien-3'-yloxy)-estr-4-en-3-one. | End-product Ex. 62. |
| 168 | 17β-(6'α,9'α-difluoro-11',20'-dioxo-17'α,21'-dihydroxypregna-1',3'-5'-trien-3'-yloxy)-estr-4-en-3-one. | End-product Ex. 66. |
| 169 | 17β-(6'α,9'α-difluoro-11'β,17'α,21'-trihydroxy-20'-oxopregna-1',3',5'-trien-3'-yloxy)-estr-4-en-3-one. | End-product Ex. 21. |
| 170 | 17β-(9'α-fluoro-11'β,21'-dihydroxy-16'α,17'α-isopropylidenedioxy-20'-oxopregna-1',3',5'-trien-3'-yloxy)-5β-androstan-3-one. | End-product Ex. 23. |
| 171 | 17β-(11'β,17'α,21'-trihydroxy-20'-oxopregna-3',5'-dien-3'-yloxy)-estr-4-en-3-one. | End-product Ex. 39. |

EXAMPLE 172

17β - (9'α-fluoro - 11',20'-dioxo-17'α-hydroxy-21'-hemisuccinoxy - 16'β - methylpregna-1,'3',5'-trien-3'-yloxy)-estr-4-en-3-one A solution of 1.4 g. of 17β-(9'-α-fluoro-11',20'-dioxo-17'α,21' - dihydroxy-16'β - methylpregna-1',3',5'-trien-3'-yloxy)-estr-4-en-3-one (Ex. 158) and 4.2 g. of succinic anhydride in 42 ml. of pyridine was kept overnight at room temperature. The mixture was then poured into 500 ml. of saturated salt solution and extracted with ether. The organic layer was separated, dried on anhydrous sodium sulfate and the solvent removed under reduced pressure. The residue was crystallized from methylene chloride-methanol to give 940 mg. of crystals of 17β-(9'α-fluoro - 11',20' - dioxo-17'α-hydroxy-21'-hemisuccinoxy-16'β-methylpregna-1',3',5'-trien-3'-yloxy)-estr-4-en-3-one, melting at 197-201° C. (dec.), $[\alpha]_D = -44°$ (c.=1%, dioxane).

In accordance with the above procedure, using phthalic anhydride or succinic anhydride, the following disteroidyl ethers are obtained.

| Ex. | Name | Preparation from— |
|---|---|---|
| 173 | 17β-(20'-oxo-21'-succinoxy-5'β-pregn-3'-en-3'-yloxy)-5β-androstan-3-one. | End-product Ex. 159. |
| 174 | 17β-(9'α-fluoro-11'β,17'α,21'-trihydroxy-20'-oxo-16'β-methylpregna-1',3',5'-trien-3'-yloxy)-estr-4-en-3-one 21'-hemiphtalate. | End-product Ex. 161. |
| 175 | 17β-(9'α-fluoro-11'β,17'α,21'-trihydroxy-20'-oxo-16'β-methylpregna-1',3',5'-trien-3'-yloxy)-estr-4-en-3-one 21'-hemisuccinate. | End-product Ex. 161. |
| 176 | 17β-(9'α-fluoro-11'β,17'α,21'-trihydroxy-20'-oxo-16'β-methylpregna-1',3',5'-trien-3'-yloxy)-5α-androstan-3-one 21'-hemiphtalate. | End-product Ex. 165. |
| 177 | 17β-(9'α-fluoro-11'β,17'α,21'-trihydroxy-20'-oxo-16'α-methylpregna-1',3',5'-trien-3'-yloxy)-estr-4-en-3-one 21'-hemisuccinate. | End-product Ex. 166. |
| 178 | 17β-(9'α-fluoro-11',20'-dioxo-17'α,21'-dihydroxy-16'α-methylpregna-1',3',5'-trien-3'-yloxy)-estr-4-en-3-one 21'-hemisuccinate. | End-product Ex. 167. |
| 179 | 17β-(6'α,9'α-difluoro-11',20'-dioxo-17'α,21'-dihydroxypregna-1',3',5'-trien-3'-yloxy)-estr-4-en-3-one 21'-hemisuccinate. | End-product Ex. 168. |
| 180 | 17β-(6'α,9'α-difluoro-11'β,17'α,21'-trihydroxy-20'-oxopregna-1',3',5'-trien-3'-yloxy)-estr-4-en-3-one-21'-hemisuccinate. | End-product Ex. 169. |
| 181 | 17β-(9'α-fluoro-11'β,21'-dihydroxy-16'α,17'α-isopropylidenedioxy-20'-oxopregna-1',3',5'-trien-3'-yloxy)-5β-androstan-3-one 21'-hemisuccinate. | End-product Ex. 171. |
| 182 | 17β-(9'α-fluoro-11',20'-dioxo-17'α,21'-dihydroxy-16'β-methylpregna-1',3',5'-trien-3'-yloxy)-5β-androstan-3-one 21'-hemisuccinate. | End-product Ex. 162. |
| 183 | 17β-(9'α-fluoro-11'β,17'α,21'-trihydroxy-20'-oxo-16'β-methylpregna-1',3',5'-trien-3'-yloxy)-5β-androstan-3-one 21'-hemisuccinate. | End-product Ex. 163. |

EXAMPLE 184

17β-(17'β-hydroxy-5'α-androst-2'-en-3'-yloxy)-5α-androstan-3-one

To a solution of 2 g. of 17β-(17'β-acetoxy-5'α-androst-2'-en-3'-yloxy)-5α-androstan-3-one (Ex. 40) in 100 ml. methanol and 50 ml. tetrahydrofuran, 7 ml. 10% K₂CO₃ solution was added. After refluxing for 4 hours, the solvent was removed under reduced pressure, water was added and the product was collected by filtration. Recrystallization from methylene chloride-methanol gave 1.5 g. of 17β - (17'β-hydroxy-5'α-androst-2'-en-3'-yloxy)-5α-androstan-3-one, melting at 257–260° C., [α]$_D$=+63° (c.=1%, dioxane).

In accordance with the above procedure the following disteroidyl ethers are obtained.

| Ex. | Name | Preparation from— |
|---|---|---|
| 185 | 17β-(11',20'-dioxo-5'β-pregn-3'-en-3'-yloxy)-estra-4-en-3β-ol. | End-product Ex. 47. |
| 186 | 17β-(11',20'-dioxo-17'α-acetoxy-5'β-pregn-3'-en-3'-yloxy)-5β-androstan-3α-ol. | End-product Ex. 89. |
| 187 | 17β-(20'-oxo-5'α-pregn-2'-en-3'-yloxy)-5β-androstan-3α-ol. | End-product Ex. 90. |
| 188 | 17β-(20'-oxo-5'α-pregna-1',3'-dien-3'-yloxy)-5β-androstan-3α-ol. | End-product Ex. 49. |
| 189 | 17β-(17'β-hydroxy-5'α-androsta-1',3'-dien-3'-yloxy)-5α-androst-1-en-3-one. | End-product Ex. 27. |
| 190 | 17β-(17'β-hydroxy-5'α-androst-2'-en-3'-yloxy)-5α-androst-1-en-3-one. | End-product Ex. 41. |

EXAMPLE 191

17β-(17'α-acetoxy-20'-oxo-6'-methylpregna-3',5'-dien-3'-yloxy)-estr-4-en-3β-ol

To a solution of 2 g. 17β-(17'α-acetoxy-20'-oxo-6'-methylpregna - 3',5'-dien-3'-yloxy)-estr-4-en-3-one (Ex. 13) in 30 ml. tetrahydrofuran, 0.4 g. sodium borhydride in 2 ml. water was added. After keeping overnight at room temperature under occasional stirring, the solvent was removed under reduced pressure, then water was added and the product recovered by filtration. Recrystallization from methylene chloride-methanol afforded pure 17β - (17'α-acetoxy-20'-oxo-6'-methylpregna-3',5'-dien-3'-yloxy)-estr-4-en-3β-ol.

In accordance with the above procedure the following disteroidyl ethers are obtained.

| Ex. | Name | Preparation from— |
|---|---|---|
| 192 | 17β-(20'-oxo-17'α-acetoxy-5'α-pregna-1',3'-dien-3'-yloxy)-5α-androstan-3β-ol. | End-product Ex. 50. |
| 193 | 17β-(17'β-hydroxy-19'17'α-pregna-3',5'-dien-20'-yn-3'-yloxy)-estr-4-en-3β-ol. | End-product Ex. 125. |
| 194 | 17β-(6'α,9'α-difluoro-11'β-hydroxy-17'α-propionoxy-20'-oxopregna-1',3',5'-trien-3'-yloxy)-estr-4-en-3β-ol. | End-product Ex. 64. |
| 195 | 17β-(20'-oxo-17'α-acetoxy-19'-norpregna-3',5'-dien-3'-yloxy)-estr-4-en-3β-ol. | End-product Ex. 110. |

EXAMPLE 196

17β-(9'α - fluoro - 11',20'-dioxo-17'α,21'-dihydroxy-16'β-methyl-pregna - 1'-3',5' - trien-3'-yloxy)-5α-androst-1-en-3-one 21'-disodium phosphate To a solution of 0.1 ml. of redistilled phosphorus oxychloride in 5 ml. of pyridine is added at −25° C. with stirring a solution of 400 mg. of 17β-(9'α-fluoro-11',20'-dioxo - 17'α,21'-dihydroxy-16'β-methylpregna - 1',3',5'-trien-3'-yloxy)-5α-androst-1-en-3-one in 5 ml. of anhydrous pyridine. To the dichloride thus formed 20 ml. of water is added at the rate that the reaction temperature does not exceed −10° C. The mixture is then allowed to remain at room temperature for 10 minutes and the pyridine is removed in vacuo without applying external heat. The resulting residue is taken up in water, then sodium bicarbonate solution is carefully added until the mixture reaches pH 7. After extraction with chloroform, the aqueous phase is concentrated under vacuum to dryness. The residue is dissolved in methanol and the title compound precipitated by addition of 1:1 mixture of anhydrous ether and absolute ethanol.

| Ex. | Name | Preparation from— |
|---|---|---|
| 197 | 17β-(9'α-fluoro-11',20'-dioxo-17'α,21'-dihydroxy-16'β-methylpregna-1',3',5'-trien-3'-yloxy)-5α-androst-1-en-3-one 21'-disodium phosphate. | End-product Ex. 164. |
| 198 | 17β-(9'α-fluoro-11',20'-dioxo-17'α,21'-dihydroxy-16'β-methylpregna-1',3',5'-trien-3'-yloxy)-estr-4-en-3-one 21'-disodium phosphate. | End-product Ex. 158. |
| 199 | 17β-(9'α-fluoro-11',17'α,21'-trihydroxy-20'-oxo-16'β-methylpregna-1',3',5'-trien-3'-yloxy)-estr-4-en-3-one 21'-disodium phosphate. | End-product Ex. 161. |

EXAMPLE 200

17β-[17'β-(cyclohex-1''-enyloxy)-5'α-androst-2'-en-3'-yloxy]-5α-androstan-3-one

To an anhydrous boiling solution of 2.5 ml. cyclohexanone diethylketal and 20 mg. p-toluenesulfonic acid in 700 ml. benzene, 2 g. 17β-(17'β-hydroxy-5'α-androst-2'-en-3'-yloxy)-5α-androstan-3-one (Ex. 184) was added and the mixture was heated with rapid solvent distillation for about 40 minutes. Then 1 ml. pyridine was added and the solvent completely removed under reduced pressure. The residue was taken up with methanol-ether, filtered and recrystallized from methylene chloride-methanol to give 1.7 g. 17β-[17'β'-(cyclohex-1''-enyloxy)-5'α-androst-2'-en-3'-yloxy] - 5α-androstan-3-one, melting at 148–153° C. (dec.), [α]$_D$=+10° (c.=1%, dioxane).

In accordance with the above procedure the following disteroidyl ethers are obtained.

| Ex. | Name | Preparation from— |
|---|---|---|
| 201 | 17β-[17'β-(1''-phenylprop-1''-enyloxy)-5'α-androst-2'-en-3'-yloxy]-5α-androstan-3-one. | Product Ex. 184 and propiophenone diethyl ketal. |
| 202 | 17β-[17'β-(n.hex-1''-enyloxy)-5'α-androst-2'-en-3'-yloxy]-5α-androstan-3-one. | Product Ex. 184 and n.hexaldehyde diethyl acetal. |
| 203 | 17β-[17'β-(2'-methylbut-1''-enyloxy)-5'α-androst-2'-en-3'-yloxy]-5α-androstan-3-one. | Product Ex. 184 and 2-methylbutyraldehyde diethyl ketal. |
| 204 | 17β-[17'β-(cyclopent-1''-enyloxy)-5'α-androst-2'-en-3'-yloxy]-5α-androstan-3-one. | Product Ex. 184 and cyclopentanone diethyl ketal. |
| 205 | 17β-[17'β-(cyclooct-1''-enyloxy)-5'α-androsta-1',3'-dien-3'-yloxy]-5α-androst-1-en-3-one. | Product Ex. 189 and cyclooctanone dimethyl ketal. |

We claim:
1. A disteroidyl ether consisting of two steroid moieties St and St', joined together by an oxygen atom linking the $C_{17}$-position of steroid St with the $C_3'$ position of steriod St', wherein the steroid moiety St is selected from the group consisting of:
(1) An androstane, a 19-norandrostane and a 13-ethylgonane derivative of the 5α- and 5β-series, optionally containing a single double bond between the carbon atoms in 1:2, 4:5 or 5:6 positions or two double bonds between the carbon atoms in 1:2 and 4:5 positions, said androstane, 19-norandrostane and 13-ethyl-gonane derivative having at the $C_3$-position a substituent selected from the group consisting of hydrogen, a ketonic oxygen, and α- and β-hydroxy group, and α- and β-lower acyloxy group, an ester of said α- and β-hydroxy group with a hydrocarbon dicarboxylic acid radical selected from the group consisting of hemisuccinyl and hemiphthalyl radicals, and a sulfate ester of said α- and β-hydroxy group; and wherein the steroid moiety St' is selected from the group consisting of:
(1') An androstane, a 19-norandrostane and a 13-ethylgonane derivative of the 5α- and 5β-series, having an unsaturated structure selected from the group consisting of $\Delta^2$-ene, $\Delta^3$-ene, $\Delta^{1,3}$-diene, and $\Delta^{3,5}$-diene; having at the $C_{9a}$-position a substituent selected from the group consisting of a hydrogen and a halogen atom; having at the $C_{11}$-position a substituent selected from the group consisting of hydrogen, a hydroxy group, and a methyl group; and having at the $C_{17}$-position at least one substituent selected from the group consisting of a 17-keto group, a 17β-hydroxy group, an ether of said 17β-hydroxy group with an alkenyl or cycloalkenyl radical containing from 4 to 8 carbon atoms, an ester of said 17β-hydroxy group with a hydrocarbon monocarboxylic acid radical containing up to 12 carbon atoms, an ester of said 17β-hydroxy group with a hydrocarbon dicarboxylic acid radical selected from the group consisting of a hemisuccinyl and a hemiphthalyl radical; a sulfate or phosphate ester of said 17β-hydroxy group; a combination of a 17β-hydroxy group together with a 17α-lower alkyl, alkenyl or alkynyl group; a combination of an ester of said 17β-hydroxy group with a hydrocarbon mono-carboxylic acid radical containing up to 12 carbon atoms, together with a 17α-lower alkyl, alkenyl or alkynyl group; a combination of an ester of said 17β-hydroxy group with a hydrocarbon di-carboxylic acid radical selected from the group consisting of a hemisuccinyl and a hemiphthalyl radical, together with a 17α-lower alkyl, alkenyl or alkynyl group; a combination of a sulfate or phosphate ester of said 17β-hydroxy group together with a 17-lower alkyl, alkenyl or alkynyl group; and a 17-spirolactone group optionally coupled with a mercapto-acetate group in $C_7$-position; and
(2') A 20-ketopregnane of the 5α- and 5β-series, and a corresponding 19-nor derivative thereof, having an unsaturated structure selected from the group consisting of $\Delta^2$-ene, $\Delta^3$-ene, $\Delta^{1,3}$-diene, $\Delta^{3,5}$-diene and $^{1,3,5}$-triene; having at the $C_6$-position a substituent selected from the group consisting of hydrogen, a methyl group, a chlorine and a fluorine atom; having at the $C_{9a}$-position a substituent selected from the group consisting of hydrogen, fluoro and chloro; having at the $C_{11}$-position a substituent selected from the group consisting of hydrogen, a hydroxy group, a ketonic oxygen and a chlorine atom; having at the $C_{16}$-position a substituent selected from the group consisting of hydrogen, an α-hydroxy group, an α-methyl group, a β-methyl group and a methylene group; having at the $C_{17a}$-position a substituent selected from the group consisting of hydrogen, a hydroxy group and a lower acyloxy group containing up to 4 carbon atoms; and having at the $C_{21}$-position a substituent selected from the group consisting of hydrogen, a hydroxy group, an ester of said hydroxy group with a lower hydrocarbon mono-carboxylic acid radical, an ester of said hydroxy group with a hydrocarbon di-carboxylic acid radical selected from the group consisting of a hemisuccinyl, and a hemiphthalyl radical; and a sulfate or phosphate ester of said 21-hydroxy group; said 20-ketopregnane derivative being also optionally substituted at the $C_{16}$ and $C_{17}$-positions by a lower alkylidenedioxy group.

2. The process for preparing disteroidyl ethers according to claim 1 which comprises the step of reacting a 17β-hydroxy-steroid, selected from the group consisting of the androstane, 19-nor-androstane, gonane and 13-lower alkyl gonane series, with an enolized or acetalized 3-keto-steroid of the androstane and pregnane series and their 18-homo and 19-nor derivatives, under anhydrous conditions and in the presence of an acid catalyst selected from the group consisting of p-toluenesulfonic acid, naphthalenesulfonic acid, pyridine p-toluenesulfonate and pyridine chlorhydrate.

3. The process for preparing disteroidyl ethers according to claim 1 which comprises the step of reacting a 17-cycloalkenyl ether of a 17β-hydroxy steroid, selected from the group consisting of the androstane, 19-nor-androstane, gonane and 13-lower alkyl gonane series, with a 3-keto-steroid of the androstane and pregnane series and their 18-homo and 19-nor derivatives, under anhydrous conditions and in the presence of an acid catalyst selected from the group consisting of p-toluenesulfonic acid, naphthalenesulfonic acid, pyridine p-toluenesulfonate and pyridine chlorhydrate.

4. Disteroidyl ethers of formula:

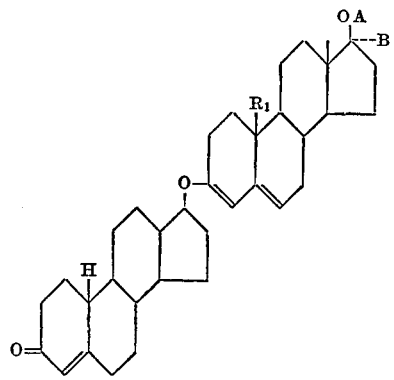

wherein:
$R_1$ represents hydogen or methyl;
A represents hydrogen, an acyl radical containing up to 12 carbon atoms, a hemisuccinyl radical or a sulfate radical;
B represents hydrogen or an alkynyl radical containing up to 3 carbon atoms.

5. 17β - (17'β - propionoxyestra-3',5'-dien-3'-yloxy)-estr-4-en-3-one.

6. 17β - (17'β - hydroxyestra-3',5'-dien-3'-yloxy)-estr-4-en-3-one.

7. 17β - (17'β - lauryloxyestra-3',5'-dien-3'-yloxy)-estr-4-en-3-one.

8. 17β - (17'β - acetoxy-19'-nor-17'α-pregna-3',5'-dien-20'-yn-3'-yloxy)-estr-4-en-3-one.

9. 17β - (17'α - acetoxy-20'-oxo-6'-methylpregna-3',5'-dien-3'-yloxy)-estr-4-en-3-one.

10. 17β - (20' - oxo-19'-norpregna-3',5'-dien-3'-yloxy)-estr-4-en-3-one.

11. 17β - (17'β - propionoxyandrosta - 3',5'-dien-3'-yloxy)-estr-4-en-3-one.

12. 17β - (17'β - hydroxyestra-3',5'-dien-3'-yloxy)-estr-4-en-3-one hemisuccinate.

13. 17β - (17'β - acetoxy - 5'α-androsta-1',3'-dien-3'-yloxy)-5α-androst-1-en-3-one.

14. 17β - (17'β - acetoxy - 19'-nor-17'α-pregna-3',5'-dien-20'-yn-3'-yloxy)-androst-5-en-3β-ol acetate.

15. 17β - (17'β - hydroxy - 17'α-methylandrosta-3',5'-dien-3'-yloxy)-androst-4-en-3-one.

16. 17β - (17'β - acetoxy - 19'-nor-17'α-pregna-3',5'-dien-20'-3'-yloxy)-androst-4-en-3one.

17. 17β (9'α - fluoro - 11'β,17'α-dihydroxy-20'-oxo-21' - acetoxy - 16'β - methylpregna-1',3',5'-trien-3'-yloxy)-estr-4-en-3-one.

18. 17β - (11'β,17'α - dihydroxy-20'-oxo-21'-acetoxy-pregna-1',3',5'-trien-3'-yloxy)-estr-4-en-3-one.

19. 17β - (17'α - acetoxy-19'-nor-20'-oxopregna-3',5'-dien-3'-yloxy)-estr-4-en-3-one.

20. 17β (17'β - hydroxy - 17'α-ethylestra-3',5'-dien-3'-yloxy)-estr-4-en-3-one.

21. 17β - (17'β - acetoxy-17'α-ethylestra-3',5'-dien-3'-yloxy)-estr-4-en-3-one.

22. 17β - (9'α - fluoro-11'β,17'α-dihydroxy-20'-oxo-21'-acetoxy - 16'β - methylpregna-3',5'-dien-3'-yloxy)-estr-4-en-3-one.

23. 17β - (17'β - acetoxy-5'α-androst-2'en-3'-yloxy)-5α-androst-1-ene-3-one.

24. 17β - (17'β - hydroxy - 5'α-androst-2'-en-3'-yloxy)-5α-androst-1-en-3-one.

25. 17β - (17'β - hydroxyandrosta-3',5'-dien-3'-yloxy)-androst-4-en-3-one.

26. 17β - (17'α - acetoxy - 20'oxopregna-3',5'-dien-3'-yloxy)-5α-androstan-3-one.

27. 17β - (17'β - hydroxyandrosta-3',5'-dien-3'-yloxy)-androst-4-en-3-one hemisuccinate.

28. 17β - (17'β - propionoxyestra-3',5'-dien-3'-yloxy)-androst-4-en-3-one.

29. 17β - (11',20' - dioxo - 17'α-hydroxy-21'-acetoxy-pregna-1',3',5'-trien-3'-yloxy)-estr-4-en-3-one.

30. 17β - (9–α - fluoro-17'α-hydroxy-11',20'-dioxo-21'-acetoxy - 16'β - methylpregna-1',3',5'-trien-3'-yloxy)-estr-4-en-3-one.

31. 17β - (9'α - fluoro-11',20'-dioxo-17'α,21'-dihydroxy-16'β - methylpregna - 1',3',5'-trien-3'-yloxy)-estr-4-en-3-one.

32. 17β - (9'α - fluoro-11',20'-dioxo-17'α-hydroxy-21'-hemisuccinoxy - 16'β - methylpregna-1',3',5'-trien-3'-yloxy)-estr-4-en-3-one.

33. 17β - (17'β - acetoxyestra-3',5'-dien-3'-yloxy)-estr-4-en-3-one.

34. 17β - (9'α - fluoro-11'β,17'α-dihydroxy-21'-acetoxy-16'β - methylpregna - 3',5' - dien-3'-yloxy)-5α-androst-1-en-3-one.

35. Disteroidyl ethers of formula:

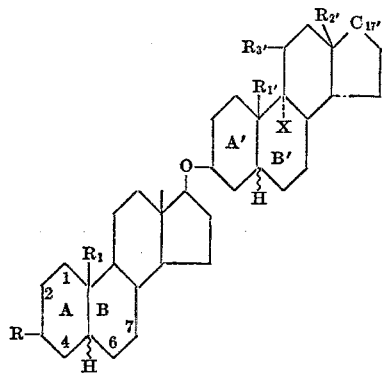

wherein the wavy line indicates that the hydrogen atom in 5 and 5' positions may have an α or β configuration;

R represents a ketonic oxygen, an α- or β-hydroxy group, an α- or β-lower acyloxy group or an ester of said α- and β-hydroxy groups with a hydrocarbon di-carboxylic acid radical selected from the group consisting of a hemisuccinyl and a hemiphthalyl radical;

$R_1$ and $R_{1'}$ each represent hydrogen or methyl;

$R_{2'}$ represents methyl or ethyl;

$R_{3'}$ represents hydrogen or hydroxy;

X represents hydrogen or fluoro;

the carbon atom at the $C_{17'}$ position having one of the following structures

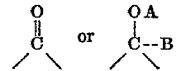

wherein:

A represents hydrogen, an acyl radical containing up to 12 carbon atoms, a hemisuccinyl or hemiphthalyl radical or a sulfate or phosphate radical;

B represents hydrogen, an alkyl or an alkynyl radical containing up to 4 carbon atoms inclusive:

the rings A and B optionally being saturated or optionally having one unsaturation between the carbon atoms in 1:2, 4:5 or 5:6, positions or two unsaturations between the carbon atoms in 1:2 and 4:5 positions; the rings A' and B' having one of the following structures:

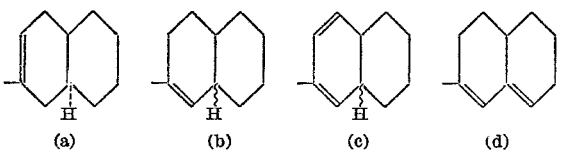

(a)     (b)     (c)     (d)

36. In the process for preparing disteroidyl ethers according to claim 35 the step which comprises reacting a 17β-hydroxy steroid of formula:

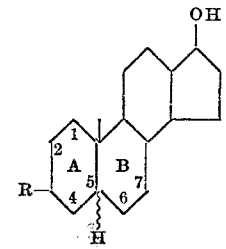

wherein the wavy line in the 5-position and the substituents R and $R_1$ are as defined in claim 42, the 1, 2, 6 and 7 positions are optionally substituted by a methyl radical or a halogen atom and the rings A and B optionally have one or two unsaturations, with an enolether or acetal of a 3-ketosteriod of formula:

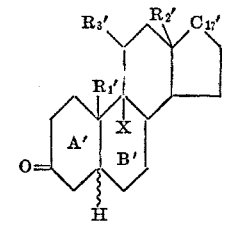

wherein the wavy line in 5'-position and the substituents $R_{1'}$, $R_{2'}$, $R_{3'}$, and X are as defined in claim 35, the carbon atom $C_{17'}$ has the structure

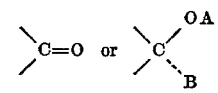

where A and B are as defined in claim 35 with the exception that A is never hydrogen, the 1', 2', 6' and 7' positions are optionally substituted by a methyl radical or a halogen atom and the rings A' and B' of said 3-ketosteroid show one of the following structures:

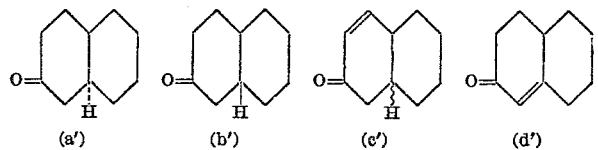

(a')     (b')     (c')     (d')

said reaction being carried out under anhydrous conditions, in the presence of an acid catalyst selected from the group consisting of p-toluenesulfonic acid, naphthalenesulfonic acid, pyridine p-toluenesulfonate and pyridine chlorhydrate, and at temperatures between 50° and 200° C.

37. Disteroidyl ethers of formula:

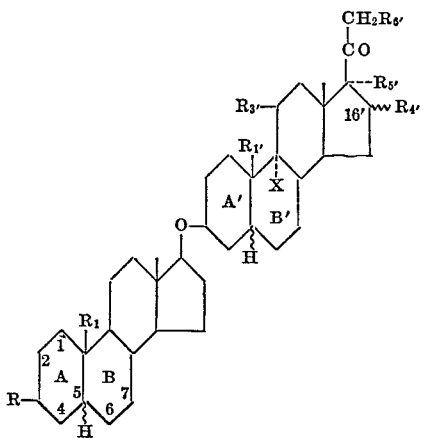

wherein the wavy line indicates that the hydrogen atom in 5 and 5' positions and the optional substituent in position 16' may have an α or β configuration;

R represents a ketonic oxygen, an α- or β-hydroxy group, an α- or β-lower acyloxy group or an ester of said α- and β-hydroxy groups with a hydrocarbon di-carboxylic acid radical selected from the group consisting of hemisuccinyl and hemiphthalyl radicals;

$R_1$ and $R_{1'}$ each represent hydrogen or methyl;

$R_{3'}$ represents hydrogen, β-hydroxy, ketonic oxygen or chloro when also X represents chloro;

$R_{4'}$ represents hydrogen, α-hydroxy, α-methyl, β-methyl or methylene;

$R_{5'}$ represents hydrogen, hydroxy or a lower acyloxy group containing up to 4 carbon atoms, inclusive;

$R_{6'}$ represents hydrogen, hydroxy, or an O-acyl group in which acyl is selected from the group consisting of a lower acyl radical, a hemisuccinyl, hemiphthalyl, a sulfate and a phosphate radical;

$R_{4'}$ and $R_{5'}$ may form together an isopropylidenedioxy radical or a 1'-methylbenzylidenedioxy radical;

X represents hydrogen, fluoro or chloro;

the rings A and B optionally being saturated or optionally having one unsaturation between the carbon atoms in 1:2, 4:5 or 5:6 positions or two unsaturations between the carbon atoms in 1:2 and 4:5 positions; the rings A' and B' having one of the following structures:

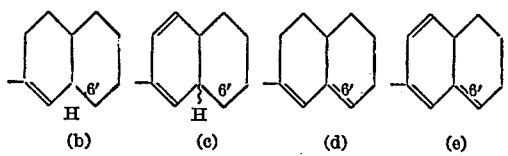

wherein, when either (d) or (e) is present, position 6' may be substituted by chloro, fluoro or methyl.

38. In the process for preparing disteroidyl ethers according to claim 37 the step which comprises reacting a 17β-hydroxysteroid of formula:

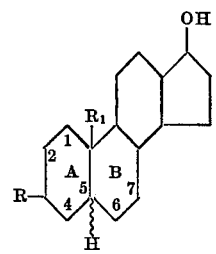

wherein the wavy line in the 5-position and the substituents R and $R_1$ are as defined in claim 37, the 1, 2, 6 and 7 positions are optionally substituted by a methyl radical or a halogen atom and the rings A and B optionally have one or two unsaturations, with an enolether or acetal of a 3-ketosteroid of formula:

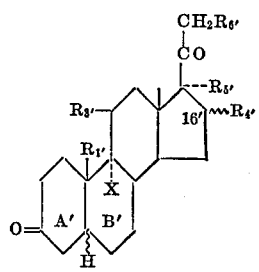

wherein the wavy line in 5'- and 16'-positions and the substituents $R_{1'}$, $R_{3'}$, $R_{4'}$, $R_{5'}$ and $R_{6'}$ are as defined in claim 37 with th exception that $R_{6'}$ is never a free hydroxy, the 1', 2', 6' and 7' positions are optionally substituted with a methyl radical or a halogen atom and the rings A' and B' of said 3-ketosteroid show one of the following structures:

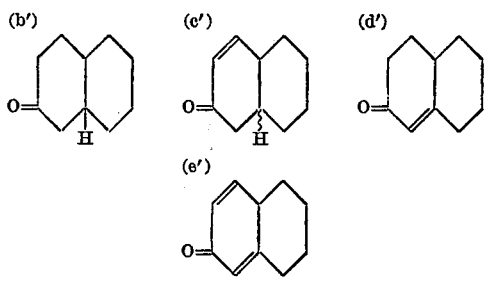

said reaction being carried out under anhydrous conditions, in the presence of an acid catalyst selected from the group consisting of p-toluenesulfonic acid, naphthalenesulfonic acid, pyridine p-toluenesulfonate and pyridine chlorhydrate, and at temperatures between 50° and 200° C.

39. 4',5' - dihydrospiro[3 - (3" - oxoestr-4"-en-17"β-yloxy) - androsta - 3,5-diene-17,2'(3'4)-furane]-7α-thiol acetate.

40. 17β - (17'β - propionoxyestra-3',5'-diene-3'-yloxy)-5α-androst-2-ene.

No references cited.

ELBERT L. ROBERTS, Primary Examiner

U.S. Cl. X.R.

260—397.45, 239.55, 239.57, 397.5